United States Patent
Engelke et al.

(10) Patent No.: US 9,967,380 B2
(45) Date of Patent: *May 8, 2018

(54) SYSTEM FOR TEXT ASSISTED TELEPHONY

(71) Applicant: Ultratec, Inc., Madison, WI (US)

(72) Inventors: Robert M Engelke, Madison, WI (US); Kevin R Colwell, Middleton, WI (US)

(73) Assignee: ULTRATEC, INC., Madison, WI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/010,199

(22) Filed: Jan. 29, 2016

(65) Prior Publication Data

US 2017/0187858 A1 Jun. 29, 2017

Related U.S. Application Data

(63) Continuation of application No. 14/506,080, filed on Oct. 3, 2014, now abandoned, which is a continuation (Continued)

(51) Int. Cl.
*H04M 11/00* (2006.01)
*H04M 1/247* (2006.01)
(Continued)

(52) U.S. Cl.
CPC ....... *H04M 1/2475* (2013.01); *H04M 1/2155* (2013.01); *H04M 3/42161* (2013.01);
(Continued)

(58) Field of Classification Search
CPC .......... H04M 1/2475; H04M 3/42161; H04M 3/42382; H04M 1/2155; H04M 3/42391; H04M 2201/60; H04M 2201/40
See application file for complete search history.

(56) References Cited

U.S. PATENT DOCUMENTS

| | | |
|---|---|---|
| 3,372,246 A | 3/1968 | Knuepfer |
| 3,507,997 A | 4/1970 | Weitbrecht |

(Continued)

FOREIGN PATENT DOCUMENTS

| | | |
|---|---|---|
| DE | 2647097 | 4/1978 |
| DE | 2749923 A1 | 5/1979 |

(Continued)

OTHER PUBLICATIONS

United States Patent and Trademark Office, Office Action Summary and Detailed Action, U.S. Appl. No. 09/783,679 (U.S. Pat. No. 6,594,346), Jun. 5, 2002.

(Continued)

*Primary Examiner* — Stella Woo
(74) *Attorney, Agent, or Firm* — Quarles & Brady LLP

(57) ABSTRACT

A communication system including a hard of hearing user's captioned device, the captioned device including a display screen and a processor. The processor in the captioned device is configured to: establish communication with a hard of hearing user's phone device that is independent of the hard of hearing user's captioned device, receive a text communication originating at a relay, the text communication corresponding to a transcription of the hearing user's voice signal, and display a text caption corresponding to the text communication on the display of the hard of hearing user's captioned device.

63 Claims, 4 Drawing Sheets

Related U.S. Application Data of application No. 13/486,205, filed on Jun. 1, 2012, now Pat. No. 9,131,045, which is a continuation of application No. 11/955,476, filed on Dec. 13, 2007, now Pat. No. 8,213,578, which is a continuation of application No. 11/257,703, filed on Oct. 25, 2005, now Pat. No. 7,319,740, which is a continuation of application No. 10/634,965, filed on Aug. 5, 2003, now Pat. No. 7,003,082, which is a continuation of application No. 09/938,194, filed on Aug. 23, 2001, now Pat. No. 6,603,835.

(51) Int. Cl.
  *H04M 3/42* (2006.01)
  *H04M 1/215* (2006.01)

(52) U.S. Cl.
  CPC ... *H04M 3/42382* (2013.01); *H04M 3/42391* (2013.01); *H04M 2201/40* (2013.01); *H04M 2201/60* (2013.01)

(56) References Cited

U.S. PATENT DOCUMENTS

| | | |
|---|---|---|
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs et al. |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes et al. |
| 4,307,266 A | 12/1981 | Messina |
| 4,354,252 A | 10/1982 | Lamb |
| 4,415,065 A | 11/1983 | Sandstedt |
| 4,426,555 A | 1/1984 | Underkoffler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyn |
| 4,650,927 A | 3/1987 | James |
| 4,659,876 A | 4/1987 | Sullivan et al. |
| 4,713,808 A | 12/1987 | Gaskill |
| 4,754,474 A | 6/1988 | Feinson |
| D296,894 S | 7/1988 | Chen |
| 4,777,469 A | 10/1988 | Engelke et al. |
| 4,799,254 A | 1/1989 | Dayton |
| 4,815,121 A | 3/1989 | Yoshida |
| 4,817,135 A | 3/1989 | Winebaum |
| 4,839,919 A | 6/1989 | Borges |
| 4,849,750 A | 7/1989 | Andros |
| 4,866,778 A | 9/1989 | Baker |
| 4,868,860 A | 9/1989 | Andros |
| 4,879,738 A | 11/1989 | Petro |
| 4,897,868 A | 1/1990 | Engelke et al. |
| D306,727 S | 3/1990 | Fritzsche |
| 4,908,866 A | 3/1990 | Goldwasser et al. |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts et al. |
| 5,033,088 A | 7/1991 | Shipman |
| 5,051,924 A | 9/1991 | Bergeron |
| D322,785 S | 12/1991 | Wu |
| 5,081,673 A | 1/1992 | Engelke et al. |
| 5,086,453 A | 2/1992 | Senoo |
| 5,091,906 A | 2/1992 | Reed et al. |
| 5,095,307 A | 3/1992 | Shimura |
| 5,099,507 A | 3/1992 | Mukai |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley et al. |
| 5,192,947 A | 3/1993 | Neustein |
| 5,199,077 A | 3/1993 | Wilcox et al. |
| 5,210,689 A | 5/1993 | Baker |
| 5,214,428 A | 5/1993 | Allen |
| 5,216,702 A | 6/1993 | Ramsden |
| 5,249,220 A | 9/1993 | Moskowitz |
| 5,280,516 A | 1/1994 | Jang |
| 5,289,523 A | 2/1994 | Vasile et al. |
| 5,294,982 A | 3/1994 | Salomon |
| 5,307,399 A | 4/1994 | Dai |
| 5,311,516 A | 5/1994 | Kuznicki et al. |
| 5,318,340 A | 6/1994 | Henry |
| 5,325,417 A | 6/1994 | Engelke et al. |
| 5,327,479 A | 7/1994 | Engelke et al. |
| 5,339,358 A | 8/1994 | Danish |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke et al. |
| 5,459,458 A | 10/1995 | Richardson |
| 5,463,665 A | 10/1995 | Millios et al. |
| D364,865 S | 12/1995 | Engelke et al. |
| 5,475,733 A | 12/1995 | Eisdorfer et al. |
| 5,475,798 A | 12/1995 | Handlos |
| 5,477,274 A | 12/1995 | Akiyoshi et al. |
| 5,487,102 A | 1/1996 | Rothschild |
| 5,487,671 A | 1/1996 | Shpiro |
| 5,497,373 A | 3/1996 | Hulen et al. |
| 5,508,754 A | 4/1996 | Orphan |
| 5,517,548 A | 5/1996 | Engelke et al. |
| 5,519,443 A | 5/1996 | Salomon |
| 5,519,808 A | 5/1996 | Benton, Jr. |
| 5,521,960 A | 5/1996 | Aronow |
| 5,522,089 A | 5/1996 | Kikinis |
| 5,537,436 A | 7/1996 | Bottoms |
| 5,559,855 A | 9/1996 | Dowens |
| 5,559,856 A | 9/1996 | Dowens |
| 5,574,776 A | 11/1996 | Leuca |
| 5,574,784 A | 11/1996 | LaPadula |
| 5,581,593 A | 12/1996 | Engelke et al. |
| 5,604,786 A | 2/1997 | Engelke et al. |

(56) References Cited

U.S. PATENT DOCUMENTS

| | | |
|---|---|---|
| D379,181 S | 5/1997 | Sawano et al. |
| 5,649,060 A | 7/1997 | Ellozy |
| 5,680,443 A | 10/1997 | Kasday et al. |
| 5,687,222 A | 11/1997 | McLaughlin |
| 5,701,338 A | 12/1997 | Leyen |
| 5,710,806 A | 1/1998 | Lee et al. |
| 5,712,901 A | 1/1998 | Meermans |
| 5,724,405 A | 3/1998 | Engelke et al. |
| 5,745,550 A | 4/1998 | Eisdorfer |
| 5,751,338 A | 5/1998 | Ludwig, Jr. |
| 5,787,148 A | 7/1998 | August |
| 5,799,273 A | 8/1998 | Mitchell et al. |
| 5,809,112 A | 9/1998 | Ryan |
| 5,809,425 A | 9/1998 | Colwell et al. |
| 5,815,196 A * | 9/1998 | Alshawi ............... H04N 7/142 348/14.01 |
| 5,826,102 A | 10/1998 | Escobar et al. |
| 5,850,627 A | 12/1998 | Gould et al. |
| D405,793 S | 2/1999 | Engelke et al. |
| 5,870,709 A | 2/1999 | Bernstein |
| 5,893,034 A | 4/1999 | Hikuma |
| 5,899,976 A | 5/1999 | Rozak |
| 5,905,476 A | 5/1999 | McLaughlin et al. |
| 5,909,482 A * | 6/1999 | Engelke ............... H04M 11/066 379/52 |
| 5,915,379 A | 6/1999 | Wallace |
| 5,917,888 A | 6/1999 | Giuntoli |
| 5,926,527 A | 7/1999 | Jenkins |
| 5,940,475 A | 8/1999 | Hansen |
| 5,974,116 A | 10/1999 | Engelke et al. |
| 5,978,014 A | 11/1999 | Martin |
| 5,978,654 A | 11/1999 | Colwell et al. |
| 5,982,853 A * | 11/1999 | Liebermann ......... H04M 1/2475 379/52 |
| 5,982,861 A | 11/1999 | Holloway |
| 5,991,291 A | 11/1999 | Asai |
| 5,991,723 A | 11/1999 | Duffin |
| 5,995,590 A | 11/1999 | Brunet et al. |
| 6,002,749 A | 12/1999 | Hansen et al. |
| 6,067,516 A | 5/2000 | Levay |
| 6,075,534 A | 6/2000 | VanBuskirk et al. |
| 6,075,841 A | 6/2000 | Engelke et al. |
| 6,075,842 A | 6/2000 | Engelke et al. |
| 6,100,882 A | 8/2000 | Sharman |
| 6,141,341 A | 10/2000 | Jones et al. |
| 6,141,415 A | 10/2000 | Rao |
| 6,173,259 B1 | 1/2001 | Bijl et al. |
| 6,175,819 B1 | 1/2001 | Van Alstine |
| 6,181,736 B1 | 1/2001 | McLaughlin |
| 6,181,778 B1 | 1/2001 | Ohki et al. |
| 6,188,429 B1 | 2/2001 | Martin et al. |
| 6,233,314 B1 | 5/2001 | Engelke |
| 6,243,684 B1 | 6/2001 | Stuart |
| 6,278,772 B1 | 8/2001 | Bowater |
| 6,298,326 B1 | 10/2001 | Feller |
| 6,307,921 B1 | 10/2001 | Engelke et al. |
| 6,314,396 B1 | 11/2001 | Monkowski |
| 6,317,716 B1 | 11/2001 | Braida et al. |
| 6,324,507 B1 | 11/2001 | Lewis et al. |
| 6,345,251 B1 | 2/2002 | Jansson |
| 6,377,925 B1 | 4/2002 | Greene, Jr. et al. |
| 6,381,472 B1 | 4/2002 | LaMedica, Jr. |
| 6,385,586 B1 | 5/2002 | Dietz |
| 6,389,114 B1 | 5/2002 | Dowens et al. |
| 6,445,799 B1 | 9/2002 | Taenzer |
| 6,493,426 B2 | 12/2002 | Engelke et al. |
| 6,493,447 B1 | 12/2002 | Goss et al. |
| 6,504,910 B1 | 1/2003 | Engelke et al. |
| 6,507,735 B1 | 1/2003 | Baker |
| 6,510,206 B2 | 1/2003 | Engelke et al. |
| 6,549,611 B2 | 4/2003 | Engelke et al. |
| 6,549,614 B1 * | 4/2003 | Zebryk ............... G11B 19/02 369/25.01 |
| 6,567,503 B2 | 5/2003 | Engelke et al. |
| 6,594,346 B2 | 7/2003 | Engelke |
| 6,603,835 B2 * | 8/2003 | Engelke ............... G10L 15/26 379/100.09 |
| 6,625,259 B1 | 9/2003 | Hollatz |
| 6,661,879 B1 | 12/2003 | Schwartz et al. |
| 6,668,042 B2 | 12/2003 | Michaelis |
| 6,668,044 B1 | 12/2003 | Schwartz |
| 6,701,162 B1 | 3/2004 | Everett |
| 6,748,053 B2 | 6/2004 | Engelke et al. |
| 6,763,089 B2 | 7/2004 | Feigenbaum |
| 6,775,360 B2 | 8/2004 | Davidson |
| 6,816,468 B1 * | 11/2004 | Cruickshank ....... H04L 12/1813 370/260 |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto |
| 6,885,731 B2 | 4/2005 | Engelke et al. |
| 6,894,346 B2 | 5/2005 | Onose |
| 6,934,366 B2 | 8/2005 | Engelke et al. |
| 6,934,376 B1 | 8/2005 | McLaughlin |
| 6,948,066 B2 | 9/2005 | Hind |
| 6,950,500 B1 | 9/2005 | Chaturvedi et al. |
| 6,980,953 B1 | 12/2005 | Kanevsky |
| 7,003,082 B2 | 2/2006 | Engelke et al. |
| 7,006,604 B2 | 2/2006 | Engelke |
| 7,016,479 B2 | 3/2006 | Flathers et al. |
| 7,035,383 B2 | 4/2006 | O'Neal |
| 7,088,832 B1 | 8/2006 | Cooper |
| 7,117,152 B1 | 10/2006 | Mukherji |
| 7,117,438 B2 | 10/2006 | Wallace |
| 7,142,642 B2 | 11/2006 | McClelland et al. |
| 7,142,643 B2 | 11/2006 | Brooksby |
| 7,164,753 B2 | 1/2007 | Engelke et al. |
| 7,199,787 B2 | 4/2007 | Lee et al. |
| 7,221,405 B2 | 5/2007 | Basson |
| 7,233,655 B2 | 6/2007 | Gailey |
| 7,287,009 B1 | 10/2007 | Liebermann |
| 7,295,663 B2 | 11/2007 | McLaughlin |
| 7,313,231 B2 | 12/2007 | Reid |
| 7,315,612 B2 | 1/2008 | McClelland |
| 7,319,740 B2 | 1/2008 | Engelke et al. |
| 7,363,006 B2 | 4/2008 | Mooney |
| 7,406,413 B2 | 7/2008 | Geppert |
| 7,430,283 B2 | 9/2008 | Steel, Jr. |
| 7,555,104 B2 | 6/2009 | Engelke |
| 7,573,985 B2 | 8/2009 | McClelland |
| 7,606,718 B2 | 10/2009 | Cloran |
| 7,660,398 B2 | 2/2010 | Engelke et al. |
| 7,747,434 B2 | 6/2010 | Flanagan et al. |
| 7,792,701 B2 | 9/2010 | Basson |
| 7,848,358 B2 | 12/2010 | LaDue |
| 7,881,441 B2 | 2/2011 | Engelke et al. |
| 8,213,578 B2 | 7/2012 | Engleke et al. |
| 8,379,801 B2 | 2/2013 | Romriell |
| 8,416,925 B2 | 4/2013 | Engelke et al. |
| 8,908,838 B2 | 12/2014 | Engelke et al. |
| 8,917,821 B2 | 12/2014 | Engelke et al. |
| 8,917,822 B2 | 12/2014 | Engelke et al. |
| 2001/0005825 A1 | 6/2001 | Engelke et al. |
| 2002/0007275 A1 | 1/2002 | Goto et al. |
| 2002/0055351 A1 | 5/2002 | Elsey et al. |
| 2002/0085685 A1 | 7/2002 | Engelke et al. |
| 2002/0085703 A1 | 7/2002 | Proctor |
| 2002/0094800 A1 | 7/2002 | Trop et al. |
| 2002/0101537 A1 | 8/2002 | Basson et al. |
| 2002/0103008 A1 | 8/2002 | Rahn et al. |
| 2002/0119800 A1 * | 8/2002 | Jaggers ............... H04M 1/72527 455/556.1 |
| 2002/0178001 A1 | 11/2002 | Balluff et al. |
| 2004/0083105 A1 | 4/2004 | Jaroker |
| 2005/0094776 A1 | 5/2005 | Haldeman et al. |
| 2005/0183109 A1 | 8/2005 | Basson et al. |
| 2005/0226394 A1 | 10/2005 | Engelke et al. |
| 2005/0226398 A1 | 10/2005 | Bojeun |
| 2006/0140354 A1 | 6/2006 | Engelke |
| 2006/0285652 A1 | 12/2006 | McClelland et al. |
| 2007/0036282 A1 | 2/2007 | Engelke et al. |

(56) References Cited

U.S. PATENT DOCUMENTS

| | | |
|---|---|---|
| 2008/0043936 A1 | 2/2008 | Liebermann |
| 2008/0152093 A1 | 6/2008 | Engleke et al. |
| 2008/0187108 A1 | 8/2008 | Engelke et al. |
| 2010/0063815 A1 | 3/2010 | Cloran et al. |
| 2011/0087491 A1 | 4/2011 | Wittenstein et al. |
| 2011/0123003 A1 | 5/2011 | Romriell et al. |
| 2012/0250837 A1 | 10/2012 | Engleke et al. |
| 2013/0308763 A1 | 11/2013 | Engelke et al. |

FOREIGN PATENT DOCUMENTS

| | | |
|---|---|---|
| DE | 3410619 A1 | 10/1985 |
| DE | 3632233 | 4/1988 |
| DE | 10328884 A1 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| FR | 2403697 | 4/1979 |
| FR | 2432805 | 2/1980 |
| FR | 2538978 | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | 55044283 A | 3/1980 |
| JP | 57055649 A | 4/1982 |
| JP | 58134568 A | 8/1983 |
| JP | 60259058 A | 12/1985 |
| JP | 63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 0155914 A1 | 8/2001 |
| WO | 0158165 A2 | 8/2001 |
| WO | 0180079 A2 | 10/2001 |
| WO | 02077971 A1 | 10/2002 |
| WO | 03026265 A1 | 3/2003 |
| WO | 03071774 A1 | 8/2003 |
| WO | 2005081511 A1 | 9/2005 |

OTHER PUBLICATIONS

Applicant, Response (to Jun. 5, 2002 Office Action), U.S. Appl. No. 09/783,679 (U.S. Pat. No. 6,594,346), Dec. 4, 2002.
United States Patent and Trademark Office, Notice of Allowance, U.S. Appl. No. 09/783,679 (U.S. Pat. No. 6,594,346), Feb. 19, 2003.
United States Patent and Trademark Office, Office Action Summary and Detailed Action, U.S. Appl. No. 09/789,120 (U.S. Pat. No. 6,567,503), Jun. 17, 2002.
Applicant, Amendment (Response to Jun. 17, 2002 Office Action), U.S. Appl. No. 09/789,120 (U.S. Pat. No. 6,567,503), Oct. 19, 2002.
United States Patent and Trademark Office, Notice of Allowance, U.S. Appl. No. 09/789,120 (U.S. Pat. No. 6,567,503), Dec. 30, 2002.
Canadian Intellectual Property Office, Examiner's Report, Application No. CA 2,372,061, Apr. 26, 2004.
Applicant, Response to Apr. 26, 2004 Official Action, Application No. CA 2,372,061, Oct. 26, 2004.
Canadian Intellectual Property Office, Notice of Allowance, Application No. CA 2,372,061, May 26, 2005.
Canadian Intellectual Property Office, Examiner's Report, Application No. CA 2,520,594, Mar. 7, 2006.
Applicant, Response to Mar. 7, 2006 Office Action, Application No. CA 2,520,594, Sep. 6, 2006.
Canadian Intellectual Property Office, Examiner's Report, Application No. CA 2,520,594, Nov. 27, 2006.
Applicant, Response to Nov. 27, 2006 Office Action, Application No. CA 2,520,594, May 25, 2007.
United Kingdom Patent Office, Combined Search and Examination Report, Application No. GB 0203898.2, Aug. 30, 2002.
Applicant, Response to Aug. 30, 2002 Official Letter, Application No. GB 0203898.2, Oct. 28, 2002.
United Kingdom Patent Office, Examination Report, Application No. GB 0203898.2, Jan. 21, 2003.
Applicant, Response to Jan. 21, 2003 Official Letter, Application No. GB 0203898.2, Jul. 15, 2003.
United Kingdom Patent Office, Combined Search and Examination Report, Application No. GB 0225275.7, Jan. 20, 2003.
Applicant, Response to Jan. 20, 2003 Letter, Application No. GB 0225275.7, Jul. 14, 2003.
United States Patent and Trademark Office, Office Action Summary and Detailed Action, U.S. Appl. No. 09/790,413 (U.S. Pat. No. 6,882,707), Mar. 23, 2004.
Applicant, Response to Restriction Requirement, U.S. Appl. No. 09/790,413 (U.S. Pat. No. 6,882,707), Apr. 9, 2004.
United States Patent and Trademark Office, Office Action Summary and Detailed Action, U.S. Appl. No. 09/790,413 (U.S. Pat. No. 6,882,707), May 7, 2004.
Applicant, Response to May 7, 2004 Office Action, U.S. Appl. No. 09/790,413 (U.S. Pat. No. 6,882,707), Aug. 9, 2004.
United States Patent and Trademark Office, Notice of Allowance, Examiner's Amendment and Interview Summary, U.S. Appl. No. 09/790,413 (U.S. Pat. No. 6,882,707), Dec. 10, 2004.
United States Patent and Trademark Office, Office Action Summary and Detailed Action, U.S. Appl. No. 10/336,950, Jun. 2, 2003.
United States Patent and Trademark Office, Office Action Summary and Detailed Action, U.S. Appl. No. 11/391,141 (U.S. Pat. No. 7,881,441), Mar. 9, 2010.
Applicant, First Amendment, U.S. Appl. No. 11/391,141 (U.S. Pat. No. 7,881,441), Jun. 9, 2010.
United States Patent and Trademark Office, Notice of Allowance, U.S. Appl. No. 11/391,141 (U.S. Pat. No. 7,881,441), Sep. 21, 2010.
United States Patent and Trademark Office, Supplemental Notice of Allowability, U.S. Appl. No. 11/391,141 (U.S. Pat. No. 7,881,441), Dec. 7, 2010.
European Patent Office, Communication, Application No. EP 06785768.0, Feb. 7, 2008.
Applicant, Reply to Feb. 7, 2008 Communication, Application No. EP 06785768.0, Mar. 12, 2008.
European Patent Office, Examination Report, Application No. EP 06785768.0, Aug. 9, 2010.
Applicant, Response to Aug. 9, 2010 Communication, Application No. EP 06785768.0, Dec. 20, 2010.
PCT International Search Report and Written Opinion, Application No. PCT/US2006/025236, Oct. 2, 2006.
PCT International Preliminary Report on Patentability, Application No. PCT/US2006/025236, Jan. 9, 2008.
Republic of the Philippines Intellectual Property Office, Findings/Action of Examiner, Application No. PH 1-2007-502940, Oct. 29, 2010.
Applicant, Response to Oct. 29, 2010 Office Action, Application No. PH 1-2007-502940, Dec. 29, 2010.
IP Australia, Examiner's First Report, Application No. AU 2006263680, Jun. 29, 2009.
Applicant, Response to Jun. 29, 2009 Examination Report, Application No. AU 2006263680, Jun. 17, 2010.
IP Australia, Examiner's Report No. 2, Application No. AU 2006263680, Jun. 22, 2010.
Applicant, Response to Jun. 22, 2010 Examination Report, Application No. AU 2006263680, Jul. 16, 2010.

(56) References Cited

OTHER PUBLICATIONS

United States Patent and Trademark Office, Office Action Summary and Detailed Action, U.S. Appl. No. 11/361,114 (U.S. Pat. No. 7,555,104), May 21, 2007.
Applicant, Terminal Disclaimer, U.S. Appl. No. 11/361,114 (U.S. Pat. No. 7,555,104), Jul. 23, 2007.
United States Patent and Trademark Office, Notice of Allowance and Examiner's Statement of Reasons for Allowance, U.S. Appl. No. 11/361,114 (U.S. Pat. No. 7,555,104), Sep. 15, 2008.
Applicant, Request for Continued Examination and Submission of Supplemental Information Disclosure Statement, U.S. Appl. No. 11/361,114 (U.S. Pat. No. 7,555,104), Dec. 15, 2008.
United States Patent and Trademark Office, Notice of Allowance, U.S. Appl. No. 11/361,114 (U.S. Pat. No. 7,555,104), Feb. 25, 2009.
United States Patent and Trdaemark Office, Notice of Allowance and Examiner's Statement of Reasons for Allowance, U.S. Appl. No. 09/876,340 (U.S. Pat. No. 6,504,910), Aug. 13, 2002.
PCT International Search Report, Application No. PCT/US02/18156, Oct. 29, 2002.
Canadian Intellectual Property Office, Examiner's Report, Application No. CA 2,419,150, Sep. 17, 2009.
Applicant, Response to Sep. 17, 2009 Official Action, Application No. CA 2,419,150, Mar. 12, 2010.
United States Patent and Trademark Office, Office Action Summary and Detailed Action, U.S. Appl. No. 09/938,194 (U.S. Pat. No. 6,603,835), Jul. 5, 2002.
Applicant, Response (to Jul. 5, 2002 Office Action), U.S. Appl. No. 09/938,194 (U.S. Pat. No. 6,603,835), Jan. 6, 2003.
United States Patent and Trademark Office, Notice of Allowance, U.S. Appl. No. 09/938,194 (U.S. Pat. No. 6,603,835), Mar. 18, 2003.
IP Australia, Examiner's First Report, Application No. AU 2002313798, Oct. 27, 2006.
Applicant, Response to Oct. 27, 2006 Examination Report, Application No. AU 2002313798, Feb. 9, 2007.
IP Australia, Notice of Acceptance, Application No. AU 2002313798, Apr. 2, 2007.
Canadian Intellectual Property Office, Examiner's Report, Application No. CA 2,458,372, Oct. 15, 2009.
Applicant, Response to Oct. 15, 2009 Official Action, Application No. CA 2,458,372, Apr. 15, 2010.
Canadian Intellectual Property Office, Notice of Allowance, Application No. CA 2,458,372, Jul. 27, 2010.
United Kingdom Patent Office, Examination Report, Application No. GB 0403994.7, May 28, 2004.
PCT International Search Report, Application No. PCT/US02/26815, Jan. 3, 2003.
PCT Written Opinion, Application No. PCT/US02/26815, Apr. 29, 2003.
PCT International Preliminary Examination Report, Application No. PCT/US02/26815, Apr. 14, 2004.
United States Patent and Trademark Office, Notice of Allowance and Examiner's Amendment, U.S. Appl. No. 09/956,310 (U.S. Pat. No. 6,510,206), Aug. 19, 2002.
Applicant, Applicants' Comments on Examiner's Reason for Allowance (dated Aug. 19, 2002), U.S. Appl. No. 09/956,310 (U.S. Pat. No. 6,510,206), Nov. 19, 2002.
United Kingdom Patent Office, Combined Search and Examination Report, Application No. GB 0406768.2 (Patent No. GB 2396774), Apr. 27, 2004.
PCT International Search Report, Application No. PCT/US01/29130, Mar. 1, 2003.
PCT International Preliminary Examination Report, Application No. PCT/US01/29130, Mar. 17, 2003.
United Kingdom Patent Office, Examination Report, Application No. GB 0306458.1, Sep. 17, 2003.
Applicant, Response to Sep. 17, 2003 Official Letter, Application No. GB 0306458.1, Mar. 16, 2004.
United States Patent and Trademark Office, Office Action Summary and Detailed Action, U.S. Appl. No. 09/977,842 (U.S. Pat. No. 6,549,611), Apr. 23, 2002.
Applicant, Response (to Apr. 23, 2002 Office Action), U.S. Appl. No. 09/977,842 (U.S. Pat. No. 6,549,611), Oct. 23, 2002.
Applicant, Terminal Disclaimer, U.S. Appl. No. 09/977,842 (U.S. Pat. No. 6,549,611), Oct. 23, 2002.
United States Patent and Trademark Office, Notice of Allowance, U.S. Appl. No. 09/977,842 (U.S. Pat. No. 6,549,611), Nov. 15, 2002.
United States Patent and Trademark Office, Office Action, U.S. Appl. No. 10/412,118, Nov. 3, 2003.
United States Patent and Trademark Office, Office Action Summary and Detailed Action, U.S. Appl. No. 10/316,215 (U.S. Pat. No. 6,934,366), Jul. 13, 2004.
Applicant, Response (to Jul. 13, 2004 Office Action) and Terminal Disclaimer, U.S. Appl. No. 10/316,215 (Patent No. 6,934,366), Jan. 13, 2005.
United States Patent and Trademark Office, Notice of Allowance and Detailed Action, U.S. Appl. No. 10/316,215 (U.S. Pat. No. 6,934,366), Apr. 18, 2005.
United States Patent and Trademark Office, Office Action Summary and Detailed Action, U.S. Appl. No. 10/348,466 (U.S. Pat. No. 6,748,053), Jul. 3, 2003.
Applicant, Response (to Jul. 3, 2003 Office Action) and Terminal Disclaimer, U.S. Appl. No. 10/348,466 (U.S. Pat. No. 6,748,053), Jan. 5, 2004.
United States Patent and Trademark Office, Notice of Allowance, U.S. Appl. No. 10/348,466 (U.S. Pat. No. 6,748,053), Jan. 27, 2004.
United States Patent and Trademark Office, Office Action Summary and Detailed Action, U.S. Appl. No. 10/436,650 (U.S. Pat. No. 7,164,753), Jul. 1, 2005.
Applicant, Amendment (Response to Jul. 1, 2005 Office Action), U.S. Appl. No. 10/436,650 (U.S. Pat. No. 7,164,753), Sep. 14, 2005.
United States Patent and Trademark Office, Office Action Summary and Detailed Action, U.S. Appl. No. 10/436,650 (U.S. Pat. No. 7,164,753), Nov. 17, 2005.
Applicant, Response (to Nov. 17, 2005 Office Action), U.S. Appl. No. 10/436,650 (U.S. Pat. No. 7,164,753), Jan. 18, 2006.
United States Patent and Trademark Office, Office Action Summary and Detailed Action, U.S. Appl. No. 10/436,650 (U.S. Pat. No. 7,164,753), Apr. 19, 2006.
Applicant, Response (to Apr. 19, 2006 Office Action), U.S. Appl. No. 10/436,650 (U.S. Pat. No. 7,164,753), Jun. 13, 2006.
United States Patent and Trademark Office, Notice of Allowance and Detailed Action, U.S. Appl. No. 10/436,650 (U.S. Pat. No. 7,164,753), Sep. 15, 2006.
IP Australia, Examiner's First Report, Application No. AU 2004239790, May 14, 2009.
Applicant, Response (to May 14, 2009 Examination Report), Application No. AU 2004239790, May 21, 2010.
Government of India The Patent Office, First Examination Report, Application No. 2262/KOLNP/2005, Apr. 29, 2008.
Applicant, Response to Apr. 29, 2008 Official Letter, Application No. 2262/KOLNP/2005, May 5, 2008.
Applicant, Response to Apr. 29, 2008 First Examination Report, Application No. 2262/KOLNP/2005, Oct. 23, 2008.
PCT International Preliminary Report on Patentability, Application No. PCT/US2004/014991, Dec. 1, 2005.
PCT International Search Report and Written Opinion, Application No. PCT/US2004/014991, Dec. 29, 2004.
United States Patent and Trademark Office Before the Patent Trial and Appeal Board, Decision—Institution of Inter Partes Review, *CaptionCall LLC* v. *Ultratec Inc.*, Case IPR2013-00550, U.S. Pat. No. 7,003,082 B2, Mar. 5, 2014, 13 pages.
United States Patent and Trademark Office Before the Patent Trial and Appeal Board, Decision—Institution of Inter Partes Review, *CaptionCall LLC* v. *Ultratec Inc.*, Case IPR2013-00543, U.S. Pat. No. 7,555,104, Mar. 5, 2014, 16 pages.
United States Patent and Trademark Office Before the Patent Trial and Appeal Board, Decision—Institution of Inter Partes Review, *CaptionCall LLC* v. *Ultratec Inc.*, Case IPR2013-00540, U.S. Pat. No. 6,233,314, Mar. 5, 2014, 17 pages.

(56) References Cited

OTHER PUBLICATIONS

United States Patent and Trademark Office Before the Patent Trial and Appeal Board, Decision—Institution of Inter Partes Review, *CaptionCall LLC* v. *Ultratec Inc.*, Case IPR2013-00545, U.S. Pat. No. 6,594,346, Mar. 5, 2014, 21 pages.
United States Patent and Trademark Office Before the Patent Trial and Appeal Board, Decision—Institution of Inter Partes Review, *CaptionCall LLC* v. *Ultratec Inc.*, Case IPR2013-00541, U.S. Pat. No. 5,909,482, Mar. 5, 2014, 32 pages.
United States Patent and Trademark Office Before the Patent Trial and Appeal Board, Decision—Institution of Inter Partes Review, *CaptionCall LLC* v. *Ultratec Inc.*, Case IPR2013-00544, U.S. Pat. No. 8,213,578, Mar. 5, 2014, 22 pages.
United States Patent and Trademark Office Before the Patent Trial and Appeal Board, Decision—Institution of Inter Partes Review, *CaptionCall LLC* v. *Ultratec Inc.*, Case IPR2013-00542, U.S. Pat. No. 7,319,740, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00549, U.S. Pat. No. 6,603,835 B2, Mar. 5, 2014, 26 pages.
Ultratec Inc. and CapTel Inc., Complaint for Patent Infringement, *Ultratec Inc. and CapTel Inc.* v. *Sorenson Communications Inc. and CaptionCall LLC*, Civil Action No. 13-346, May 17, 2013, 13 pages.
Ultratec Inc. and CapTel Inc., Amended Complaint for Patent Infringement and Declaratory Judgment, *Ultratec Inc. and CapTel Inc.* v. *Sorenson Communications Inc. and CaptionCall LLC*, Civil Action No. 13-346, Jul. 31, 2013, 16 pages.
Sorenson Communications Inc. and CaptionCall LLC, Defendants' Amended Answer to Plaintiffs' Amended Complaint for Patent Infringement and Declaratory Judgment and Counterclaims, *Ultratec Inc. and CapTel Inc.* v. *Sorenson Communications Inc. and CaptionCall LLC*, Civil Action No. 13-346, Aug. 14, 2013, 71 pages.
Ultratec Inc. and CapTel Inc., Plaintiffs' Answer to Defendants' Amended Counterclaims, *Ultratec Inc. and CapTel Inc.* v. *Sorenson Communications Inc. and CaptionCall LLC*, Civil Action No. 13-346, Aug. 28, 2013, 26 pages.
Sorenson Communications Inc. and CaptionCall LLC, Invalidity Contentions, *Ultratec Inc. and CapTel Inc.* v. *Sorenson Communications Inc. and CaptionCall LLC*, Civil Action No. 13-346, Sep. 23, 2013, 31 pages.
Sorenson Communications Inc. and CaptionCall LLC, Exhibits to Invalidity Contentions, *Ultratec Inc. and CapTel Inc.* v. *Sorenson Communications Inc. and CaptionCall LLC*, Civil Action No. 13-346, Sep. 23, 2013, 587 pages.
Sorenson Communications Inc. and CaptionCall LLC, Defendants' Answer to Plaintiffs' Original Complaint for Patent Infringement and Counterclaims, *Ultratec Inc. and CapTel Inc.* v. *Sorenson Communications Inc. and CaptionCall LLC*, Civil Action No. 14-66, Feb. 24, 2014, 41 pages.
Ultratec Inc. and CapTel Inc., Plaintiffs' Answer to Defendants' Counterclaims, *Ultratec Inc. and CapTel Inc.* v. *Sorenson Communications Inc. and CaptionCall LLC*, Civil Action No. 14-CV-66, Mar. 17, 2014, 14 pages.
Ultratec Inc. and CapTel Inc., Amended Complaint for Patent Infringement, *Ultratec Inc. and CapTel Inc.* v. *Sorenson Communications Inc. and CaptionCall LLC*, Civil Action No. 3-14-CV-66-BBC, Mar. 26, 2014, 11 pages.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 pages.
Intellectual Property Philippines, Official Action, Application No. PH 12005502024, Aug. 10, 2007.
Applicant, Response to Aug. 10, 2007 Official Action, Application No. PH 12005502024, Oct. 3, 2007.
Intellectual Property Philippines, Official Action, Application No. PH 12005502024, Oct. 17, 2007.
Applicant, Response to Oct. 17, 2007 Official Action, Application No. PH 12005502024, Dec. 11, 2007.
United States Patent and Trademark Office, Office Action Summary and Detailed Action, U.S. Appl. No. 10/619,040 (U.S. Pat. No. 7,006,604), Dec. 2, 2004.
Applicant, Response (to Dec. 2, 2004 Office Action) and Terminal Disclaimer, U.S. Appl. No. 10/619,040 (U.S. Pat. No. 7,006,604), Jun. 2, 2005.
United States Patent and Trademark Office, Notice of Allowance, U.S. Appl. No. 10/619,040 (U.S. Pat. No. 7,006,604), Sep. 16, 2005.
United States Patent and Trademark Office, Supplemental Notice of Allowability, Examiner's Amendment and Interview Summary, U.S. Appl. No. 10/628,193 (U.S. Pat. No. 6,885,731), Jan. 31, 2005.
United States Patent and Trademark Office, Office Action Summary and Detailed Action, U.S. Appl. No. 10/634,965 (U.S. Pat. No. 7,003,082), Jul. 16, 2004.
Applicant, Response (to Jul. 16, 2004 Office Action) and Terminal Disclaimer, U.S. Appl. No. 10/634,965 (U.S. Pat. No. 7,003,082), Jan. 14, 2005.
United States Patent and Trademark Office, Supplemental Notice of Allowability, U.S. Appl. No. 10/634,965 (U.S. Pat. No. 7,003,082), Nov. 9, 2005.
United States Patent and Trademark Office, Office Action Summary and Detailed Action, U.S. Appl. No. 11/061,682 (U.S. Pat. No. 7,660,398), Apr. 1, 2008.
Applicant, Amendment (Response to Apr. 1, 2008 Office Action), U.S. Appl. No. 11/061,682 (U.S. Pat. No. 7,660,398), Jul. 1, 2008.
United States Patent and Trademark Office, Office Action Summary and Detailed Action, U.S. Appl. No. 11/061,682 (U.S. Pat. No. 7,660,398), Nov. 4, 2008.
Applicant, Request for Continued Examination and Interview Summary, U.S. Appl. No. 11/061,682 (U.S. Pat. No. 7,660,398), Jan. 22, 2009.
United States Patent and Trademark Office, Office Action Summary and Detailed Action, U.S. Appl. No. 11/061,682 (U.S. Pat. No. 7,660,398), Mar. 25, 2009.
Applicant, Amendment, U.S. Appl. No. 11/061,682 (U.S. Pat. No. 7,660,398), Jun. 22, 2009.
United States Patent and Trademark Office, Notice of Allowance, U.S. Appl. No. 11/061,682 (U.S. Pat. No. 7,660,398), Sep. 25, 2009.
Applicant, Request for Recalculation of Patent Term Adjustment in View of Wyeth, U.S. Pat. No. 7,660,398, (U.S. Appl. No. 11/061,682), Feb. 25, 2010.
United States Patent and Trademark Office, Decision on Request for Recalculation of Patent Term Adjustment in View of Wyeth and Notice of Intent to Issue Certificate of Correction, U.S. Pat. No. 7,660,398 (U.S. Appl. No. 11/061,682), Apr. 20, 2010.
United States Patent and Trademark Office, Certificate of Correction, U.S. Pat. No. 7,660,398 (U.S. Appl. No. 11/061,682), Nov. 30, 2010.
PCT International Search Report and Written Opinion, Application No. PCT/US2005/005149, May 24, 2005.
PCT International Preliminary Report on Patentability, Application No. PCT/US2005/005149, Aug. 31, 2006.
UK Intellectual Property Office, Examination Report, Application No. GB 0617585.5, Jan. 23, 2008.
Applicant, Response to Jan. 23, 2008 Official Letter, Application No. GB 0617585.5, Jul. 22, 2008.
UK Intellectual Property Office, Combined Search and Examination Report, Application No. GB 06175855, Aug. 15, 2008.
Applicant, Response to Aug. 15, 2008 Official Letter, Application No. GB 0617585.5, Dec. 9, 2008.
UK Intellectual Property Office, Combined Search and Examination Report, Application No. GB 0813502.2, Aug. 15, 2008.
Applicant, Response to Aug. 15, 2008 Official Letter, Application No. GB 0813502.2, Dec. 9, 2008.
United States Patent and Trademark Office, Office Action Summary and Detailed Action, U.S. Appl. No. 11/257,703 (U.S. Pat. No. 7,319,740), May 3, 2007.
Applicant, Amendment and Terminal Disclaimers (Response to May 3, 2007 Office Action), U.S. Appl. No. 11/257,703 (U.S. Pat. No. 7,319,740), Jul. 26, 2007.

(56) References Cited

OTHER PUBLICATIONS

United States Patent and Trademark Office, Notice of Allowance, U.S. Appl. No. 11/257,703 (U.S. Pat. No. 7,319,740), Aug. 23, 2007.
United States Patent and Trademark Office, Office Action Summary and Detailed Action, U.S. Appl. No. 08/217,518 (U.S. Pat. No. 5,724,405), Jul. 20, 1995.
Applicant, Amendment (Response to Jul. 20, 1995 Office Action), U.S. Appl. No. 08/217,518 (U.S. Pat. No. 5,724,405), Jan. 22, 1996.
United States Patent and Trademark Office, Office Action Summary and Detailed Action, U.S. Appl. No. 08/217,518 (U.S. Pat. No. 5,724,405), Apr. 16, 1996.
Applicant, Amendment (Response to Apr. 16, 1996 Office Action) and Terminal Disclaimer, U.S. Appl. No. 08/217,518 (U.S. Pat. No. 5,724,405), Oct. 16, 1996.
United States Patent and Trademark Office, Office Action Summary and Detailed Action, U.S. Appl. No. 08/217,518 (U.S. Pat. No. 5,724,405), Jan. 15, 1997.
Applicant, Response After Final (Response to Jan. 15, 1997 Office Action) and Terminal Disclaimer, U.S. Appl. No. 08/217,518 (U.S. Pat. No. 5,724,405), Jul. 15, 1997.
United States Patent and Trademark Office, Notice of Allowability, U.S. Appl. No. 08/217,518 (U.S. Pat. No. 5,724,405), Aug. 19, 1997.
United Kingdom Patent Office, Search Report, Application No. GB 9804556.0 (Patent No. GB 2335109), Aug. 12, 1998.
United Kingdom Patent Office, Examination Report, Application No. GB 9804556.0 (Patent No. GB 2335109), Sep. 27, 2002.
Applicant, Response to United Kingdom Patent Office Sep. 27, 2002 Examination Report, Application No. GB 9804556.0 (Patent No. GB 2335109), Mar. 26, 2003.
United States Patent and Trademark Office, Notice of Allowability, U.S. Appl. No. 08/925,558 (U.S. Pat. No. 5,909,482), Oct. 27, 1998.
United Kingdom Patent Office, Examination Report, Application No. GB 9908312.3 (Patent No. GB 2334177), Apr. 15, 2002.
Applicant, Response to United Kingdom Patent Office Apr. 15, 2002 Examination Report, Application No. GB 9908312.3 (Patent No. GB 2334177), Oct. 14, 2002.
PCT International Search Report, Application No. PCT/US98/18650, Nov. 6, 1998.
Canadian Intellectual Property Office, Examination Report, Application No. CA 2,268,582, Feb. 22, 2007.
Applicant, Amendment/Remarks Following Feb. 22, 2007 Examiner's Report, Application No. CA 2,268,582, Aug. 22, 2007.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.

Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Patent and Trademark Office, U.S. Appl. No. 08/396,554, Telephone for the Deaf and Method of Using Same, filed Mar. 1, 1995.
U.S. Patent and Trademark Office, U.S. Appl. No. 09/599,347, filed Jun. 22, 2000.
U.S. Patent and Trademark Office, U.S. Appl. No. 10/099,824, Graphic User Interface for a Patient Ventilator, filed Mar. 15, 2002.
U.S. Patent and Trademark Office, U.S. Appl. No. 60/041,458, TTY Modem System, filed Mar. 25, 1997.
The Patent Office, Examination Report, Apr. 15, 2002, Application No. GB 9908312.3, 2 pages.
Applicant, Response to Apr. 15, 2002 Examination Report, Oct. 14, 2002, Application No. GB 9908312.3, 2 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.

(56) References Cited

OTHER PUBLICATIONS

CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office, Office Action Summary and Detailed Action, U.S. Appl. No. 08/946,538 (U.S. Pat. No. 6,075,841), Sep. 18, 1998.
Applicant, First Amendment (Response to Sep. 18, 1998 Office Action), U.S. Appl. No. 08/946,538 (U.S. Pat. No. 6,075,841), Jan. 15, 1999.
United States Patent and Trademark Office, Office Action Summary and Detailed Action, U.S. Appl. No. 08/946,538 (U.S. Pat. No. 6,075,841), Mar. 26, 1999.
Applicant, Response to Mar. 26, 1999 Office Action and Terminal Disclaimer, U.S. Appl. No. 08/946,538 (U.S. Pat. No. 6,075,841), Jul. 20, 1999.
United States Patent and Trademark Office, Notice of Allowability and Examiner's Amendment and Statement of Reasons for Allowance, U.S. Appl. No. 08/946,538 (U.S. Pat. No. 6,075,841), Aug. 16, 1999.
United States Patent and Trademark Office, Office Action Summary and Detailed Action, U.S. Appl. No. 09/034,076 (U.S. Pat. No. 6,075,842), Apr. 6, 1999.
Applicant Response to Apr. 6, 1999 Office Action and Terminal Disclaimer, U.S. Appl. No. 09/034,076 (U.S. Pat. No. 6,075,842), Jul. 21, 1999.
United States Patent and Trademark Office, Notice of Allowability, U.S. Appl. No. 09/034,076 (U.S. Pat. No. 6,075,842), Jan. 7, 2000.
United States Patent and Trademark Office, Notice of Allowability and Examiner's Statement of Reasons for Allowance, U.S. Appl. No. 09/108,790 (U.S. Pat. No. 5,974,116), May 11, 1999.
Canadian Intellectual Property Office, Examination Report, Application No. CA 2,268,383, May 10, 2007.
Applicant, Response to May 10, 2007 Office Action, Application No. CA 2,268,383, Nov. 9, 2007.
United Kingdom Patent Office, Examination Report, Application No. GB 9908310.7 (Patent No. GB 2339363), Jan. 25, 2003.
Applicant, Response to United Kingdom Patent Office Jan. 25, 2003 Report, Application No. GB 9908310.7 (Patent No. GB 2339363), Aug. 26, 2003.
United Kingdom Patent Office, Examination Report, Application No. GB 9908310.7 (Patent No. GB 2339363), Sep. 23, 2003.
Applicant, Response to United Kingdom Patent Office Sep. 23, 2003 Report, Application No. GB 9908310.7 (Patent No. GB 2339363), Nov. 17, 2003.
United Kingdom Patent Office, Examination Report, Application No. GB 9908310.7 (Patent No. GB 2339363), Dec. 16, 2003.
Applicant, Response to United Kingdom Patent Office Dec. 16, 2003 Report, Application No. GB 9908310.7 (Patent No. GB 2339363), Dec. 30, 2003.
United States Patent and Trademark Office, Office Action Summary and Detailed Action, U.S. Appl. No. 09/572,819 (U.S. Pat. No. 6,307,921), Oct. 25, 2000.
Applicant, Response (to Oct. 25, 2000 Office Action) and Terminal Disclaimers, U.S. Appl. No. 09/572,819 (U.S. Pat. No. 6,307,921), Apr. 25, 2001.
United States Patent and Trademark Office, Notice of Allowability, U.S. Appl. No. 09/572,819 (U.S. Pat. No. 6,307,921), Jun. 4, 2001.
United States Patent and Trademark Office, Office Action Summary and Detailed Action, U.S. Appl. No. 08/481,856 (U.S. Pat. No. 5,809,425), Aug. 28, 1996.
Applicant, Amendment (Response to Aug. 18, 1996 Office Action), U.S. Appl. No. 08/481,856 (U.S. Pat. No. 5,809,425), Feb. 28, 1997.
United States Patent and Trademark Office, Office Action Summary and Detailed Action, U.S. Appl. No. 08/481,856 (U.S. Pat. No. 5,809,425), May 28, 1997.
Applicant, Amendment (Response to May 28, 1997 Office Action), U.S. Appl. No. 08/481,856 (U.S. Pat. No. 5,809,425), Nov. 26, 1997.
United States Patent and Trademark Office, Notice of Allowance and Statement of Reasons for Allowance, U.S. Appl. No. 08/481,856 (U.S. Pat. No. 5,809,425), Dec. 23, 1997.
PCT International Search Report, Application No. PCT/US96/09492, Sep. 4, 1996.
United States Patent and Trademark Office, Office Action Summary and Detailed Action, U.S. Appl. No. 08/367,563, Aug. 2, 1996.
United States Patent and Trademark Office, Office Action Summary and Detailed Action, U.S. Appl. No. 09/153,771, Aug. 3, 1999.
Canadian Intellectual Property Office, Examiner's Report, Application No. CA 2,458,372, May 16, 2011.
Intellectual Property Philippines, Official Action, Application No. PH 12007502940, Jun. 6, 2011.
Applicant, Response to Jun. 6, 2011 Office Action, Application No. PH 12007502940, Aug. 4, 2011.
UK Intellectual Property Office, Examination Report, Application No. GB 0617585.5, Aug. 15, 2008.
UK Intellectual Property Office, Examination Report, Application No. GB 0617585.5, Dec. 17, 2008.
Applicant, Response to Dec. 17, 2008 Official Letter, Application No. GB 0617585.5, Feb. 16, 2009.
European Patent Office, Communication, Application No. EP 04761001.9, Jun. 30, 2011.
Applicant, First Amendment (in Response to United States Patent and Trademark Office Nov. 8, 2012 Office Action) U.S. Appl. No. 12/686,688, Feb. 7, 2013.
Canadian Intellectual Property Office, Examiner's Report, Application No. CA 2,613,363, Oct. 1, 2012.
Applicant, Response to Examiner's Report, Application No. CA 2,613,363, Mar. 7, 2013.
Canadian Intellectual Property Office, Notice of Allowance, Application No. CA 2,613,363, Oct. 18, 2013.
Government of India Patent Office, First Examination Report, Application No. IN 4970/KOLNP/2007, Feb. 26, 2014.
Canadian Intellectual Property Office, Examiner's Report, Application No. CA 2,556,933, Apr. 10, 2012.
Applicant, Response to Official Action, Application No. C 2,556,933, Jul. 12, 2012.
Canadian Intellectual Property Office, Notice of Allowance, Application No. CA 2,556,933, Feb. 14, 2013.
PCT International Search Report and Written Opinion, PCT/US2009/040523, Nov. 11, 2009.
Canadian Intellectual Property Office, Examiner's Report, Application No. CA 2,761,343, Mar. 8, 2012.
Applicant, Response to Official Action, Application No. CA 2,761,343, Mar. 30, 2012.
Canadian Intellectual Property Office, Notice of Allowance, Application No. CA 2,761,343, Jul. 24, 2012.
United States Patent and Trademark Office, Office Action Summary and Detailed Action, U.S. Appl. No. 11/955,476, Jan. 24, 2011.
Applicant, Amendment (Response to Jan. 24, 2011, Office Action) and Terminal Disclaimers, U.S. Appl. No. 11/955,476, May 23, 2011.
United States Patent and Trademark Office, Office Action Summary and Detailed Action, U.S. Appl. No. 11/955,476, Jun. 23, 2011.
Applicant, Amendment Submitted with a Request for Continued Examination and Terminal Disclaimers, U.S. Appl. No. 11/955,476, Oct. 19, 2011.
United States Patent and Trademark Office, Notice of Allowance, U.S. Appl. No. 11/955,476, Mar. 2, 2012.
United States Patent and Trademark Office, Office Action Summary and Detailed Action, U.S. Appl. No. 13/486,221, Sep. 13, 2013.

(56) References Cited

OTHER PUBLICATIONS

Applicant, Amendment (Response to Sep. 13, 2013, Office Action), U.S. Appl. No. 13/486,221, Mar. 11, 2014.
United States Patent and Trademark Office, Office Action Summary and Detailed Action, U.S. Appl. No. 13/486,221, Mar. 26, 2014.
Applicant, Terminal Disclaimers and Remarks, U.S. Appl. No. 13/486,221, Apr. 30, 2014.
United States Patent and Trademark Office, Office Action Summary and Detailed Action, U.S. Appl. No. 13/486,221, Jun. 25, 2014.
United States Patent and Trademark Office, Office Action Summary and Detailed Action, U.S. Appl. No. 13/950,860, Jan. 9, 2014.
Applicant, Amendment (Response to Jan. 9, 2014, Office Action), U.S. Appl. No. 13/950,860, Jun. 30, 2014.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.
Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 6,594,346, Case IPR2013-00545, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, In The United States Patent and Trademark Office Before the Patent Trial and Appeal Board, May 30, 2014.
Declaration of Brenda Battat, In Re: U.S. Pat. No. 8,231,578, Case IPR2013-00544, In The United States Patent and Trademark Office Before the Patent Trial and Appeal Board, May 8, 2014.
Declaration of Constance Phelps, In Re: U.S. Pat. No. 6,233,314, Case IPR2013-00540, In The United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.
CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 28, 2015, 65 pages.
In The United States Patent and Trademark Office Before the Patent Trial and Appeal Board, Decision—Institution of Inter Partes Review, *CaptionCall LLC* v. *Ultratec Inc.*, Case IPR2014-00780, U.S. Pat. 6,603,835, Dec. 4, 2014, 14 pages.
In The United States Patent and Trademark Office Before the Patent Trial and Appeal Board, Patent Owner Response Under 37 C.F.R. 42.120, *CaptionCall LLC* v. *Ultratec Inc.*, Case IPR2014-00780, U.S. Pat. 6,603,835, Feb. 11, 2015, 68 pages.
Ultratec Inc. and CapTel Inc., Amended Complaint for Patent Infringement, *Ultratec, Inc., et al.* v. *Sorenson Communications, Inc., et al.*, Civil Action No. 3:14-cv-847-JDP, United States District Court, Western District of Wisconsin, Dec. 23, 2014, 15 pages.
Sorenson Communications Inc. and CaptionCall LLC, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.
In The United States Patent and Trademark Office Before the Patent Trial and Appeal Board, Final Written Decision, *CaptionCall LLC* v. *Ultratec Inc.*, Case IPR2014-00540, U.S. Pat. No. 6,233,314, Mar. 3, 2015, 55 pages.
In The United States Patent and Trademark Office Before the Patent Trial and Appeal Board, Final Written Decision, *CaptionCall LLC* v. *Ultratec Inc.*, Case IPR2014-00541, U.S. Pat. No. 5,909,482, Mar. 3, 2015, 77 pages.
In The United States Patent and Trademark Office Before the Patent Trial and Appeal Board, Final Written Decision, *CaptionCall LLC* v. *Ultratec Inc.*, Case IPR2014-00542, U.S. Pat. 7,319,740, Mar. 3, 2015, 31 pages.
In The United States Patent and Trademark Office Before the Patent Trial and Appeal Board, Final Written Decision, *CaptionCall LLC* v. *Ultratec Inc.*, Case IPR2014-00543, U.S. Pat. No. 7,555,104, Mar. 3, 2015, 29 pages.

(56) References Cited

OTHER PUBLICATIONS

In The United States Patent and Trademark Office Before the Patent Trial and Appeal Board, Final Written Decision, *CaptionCall LLC v. Ultratec Inc.*, Case IPR2014-00544, U.S. Pat. No. 8,213,578, Mar. 3, 2015, 56 pages.
In The United States Patent and Trademark Office Before the Patent Trial and Appeal Board, Final Written Decision, *CaptionCall LLC v. Ultratec Inc.*, Case IPR2014-00545, U.S. Pat. No. 6,594,346, Mar. 3, 2015, 41 pages.
In The United States Patent and Trademark Office Before the Patent Trial and Appeal Board, Final Written Decision, *CaptionCall LLC v. Ultratec Inc.*, Case IPR2014-00549, U.S. Pat. No. 6,603,835, Mar. 3, 2015, 35 pages.
In The United States Patent and Trademark Office Before the Patent Trial and Appeal Board, Final Written Decision, *CaptionCall LLC v. Ultratec Inc.*, Case IPR2014-00550, U.S. Pat. No. 7,003,082, Mar. 3, 2015, 25 pages.
Declaration of Paul W. Ludwick, In Re: U.S. Pat. No. 6,594,346, Case IPR2013-00545, In The United States Patent and Trademark Office Before the Patent Trial and Appeal Board, May 11, 2014.
Declaration of Paul W. Ludwick, In Re: U.S. Pat. No. 7,555,104, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 6,233,314, Case IPR2013-00540, In The United States Patent and Trademark Office Before the Patent Trial and Appeal Board, May 30, 2014.
Declaration of Paul W. Ludwick, In Re: U.S. Pat. No. 5,909,482, Case IPR2013-00541, In The United States Patent and Trademark Office Before the Patent Trial and Appeal Board, May 30, 2014.
Declaration of Paul W. Ludwick, In Re: U.S. Pat. No. 8,213,578, Case IPR2013-00544, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,233,314, Case IPR2013-00540, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In The United States Patent and Trademark Office Before the Patent Trial and Appeal Board, May 30, 2014.
Declaration of Kelby Brick, Esq., CDI, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In The United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In The United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In The United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, In The United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In The United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In The United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, In The United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In The United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].

(56) References Cited

OTHER PUBLICATIONS

Expert Report of Mr. Benedict J. Occhiogrosso Regarding Invalidity of Asserted Claims of U.S. Pat. No. 5,909,482; U.S. Pat. No. 6,233,314; U.S. Pat. No. 6,594,346; U.S. Pat. No. 6,603,835; U.S. Pat. No. 7,003,082; U.S. Pat. No. 7,319,740; U.S. Pat. No. 7,555,104; and U.S. Pat. No. 8,213,578, *Ultratec, Inc., et al.* v. *Sorenson Communications, Inc., et al.*, Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Pat. No. 5,909,482; U.S. Pat. No. 6,233,314; U.S. Pat. No. 6,594,346; and U.S. Pat. No. 8,213,578, *Ultratec, Inc., et al.* v. *Sorenson Communications, Inc., et al.*, Civil Action No. 3:13-CV-346-BBC, United States District Court, Western District of Wisconsin, Apr. 22, 2014 [Redacted].
Validity Report of James A. Steel, Jr. Regarding U.S. Pat. No. 6,603,835; U.S. Pat. No. 7,003,082; U.S. Pat. No. 7,319,740; and U.S. Pat. No. 7,555,104, in Response to Expert Report of Benedict Occhiogrosso and Non-Infringement Report Regarding U.S. Pat. No. 8,379,801, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al.* v. *Sorenson Communications, Inc., et al.*, Civil Action No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al.* v. *Sorenson Communications, Inc., et al.*, Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al.* v. *Sorenson Communications, Inc., et al.*, Civil Action No. 14-CV-66-BBC, United States District Court, Western District of Wisconsin, Jul. 16, 2014.
Sorenson Communications, Inc. and CaptionCall, LLC's Invalidity Contentions and Exhibits, *Ultratec, Inc., et alv, Sorenson Communications, Inc., et al.*, Civil Action No. 14-CV-66-BBC, United States District Court, Western District of Wisconsin, May 16, 2014.
In The United States Patent and Trademark Office Before the Patent Trial and Appeal Board, Petitioner's Reply to Patent Owner's Response, *CaptionCall LLC* v. *Ultratec Inc.*, Case IPR2014-00780, U.S. Pat. No. 6,603,835, Apr. 20, 2015, 30 pages.
In The United States Patent and Trademark Office Before the Patent Trial and Appeal Board, Final Written Decision, *CaptionCall LLC* v. *Ultratec Inc.*, Case IPR2014-00780, U.S. Pat. No. 6,603,835, Dec. 1, 2015, 56 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2014-00780, U.S. Pat. No. 6,603,835, Dec. 31, 2015, 20 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00540, U.S. Pat. No. 6,233,314, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00540, U.S. Pat. No. 6,233,314, Dec. 1, 2015, 18 pages.
In The United States Patent and Trademark Office Before the Patent Trial and Appeal Board, Patent Owner's Notice of Appeal, *CaptionCall LLC* v. *Ultratec Inc.*, Case IPR2013-00540, U.S. Pat. No. 6,233,314, Feb. 2, 2016, 19 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00541, U.S. Pat. No. 5,909,482, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00541, U.S. Pat. No. 5,909,482, Dec. 1, 2015, 18 pages.
In The United States Patent and Trademark Office Before the Patent Trial and Appeal Board, Patent Owner's Notice of Appeal, *CaptionCall LLC* v. *Ultratec Inc.*, Case IPR2013-00541, U.S. Pat. No. 5,909,482, Feb. 2, 2016, 19 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00542, U.S. Pat. No. 7,319,470, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00542, U.S. Pat. No. 7,319,470, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00542, U.S. Pat. No. 7,319,470, Feb. 2, 2016, 12 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00543, U.S. Pat. No. 7,555,104, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00543, U.S. Pat. No. 7,555,104, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00543, U.S. Pat. No. 7,555,104, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00544, U.S. Pat. No. 8,213,578, Apr. 2, 2015, 19 pages.
In The United States Patent and Trademark Office Before the Patent Trial and Appeal Board, Decision Denying Patent Owner's Request

(56) References Cited

OTHER PUBLICATIONS for Rehearing, *CaptionCall LLC* v. *Ultratec Inc.*, Case IPR2013-00544, U.S. Pat. No. 8,213,578, Dec. 1, 2015, 19 pages.
In The United States Patent and Trademark Office Before the Patent Trial and Appeal Board, Patent Owner's Notice of Appeal, *CaptionCall LLC* v. *Ultratec Inc.*, Case IPR2013-00544, U.S. Pat. No. 8,213,578, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00545, U.S. Pat. No. 6,594,346, Apr. 2, 2015, 16 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00545, U.S. Pat. No. 6,594,346, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00545, U.S. Pat. No. 6,594,346, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00549, U.S. Pat. No. 6,603,835, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00549, U.S. Pat. No. 6,603,835, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00549, U.S. Pat. No. 6,603,835, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00550, U.S. Pat. No. 7,003,082, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00550, U.S. Pat. No. 7,003,082, Dec. 1, 2015, 10 pages.
In The United States Patent and Trademark Office Before the Patent Trial and Appeal Board, Patent Owner's Notice of Appeal, *CaptionCall LLC* v. *Ultratec Inc.*, Case IPR2013-00550, U.S. Pat. No. 7,003,082, Feb. 2, 2016, 11 pages.
In The United States Patent and Trademark Office Before the Patent Trial and Appeal Board, Decision Denying Institution of Inter Partes Review, *CaptionCall LLC* v. *Ultratec Inc.*, Case IPR2014-01287, U.S. Pat. No. 7,660,398, Feb. 12, 2015, 15 pages.
In The United States Patent and Trademark Office Before the Patent Trial and Appeal Board, Request for Rehearing, *CaptionCall LLc* v. *Ultratec Inc.*, Case IPR2014-01287, U.S. Pat. No. 7,660,398, Mar. 13, 2015, 18 pages.
In The United States Patent and Trademark Office Before the Patent Trial and Appeal Board, Decision Denying Request for Rehearing, *CaptionCall LLC* v. *Ultratec Inc.*, Case IPR2014-01287, U.S. Pat. No. 7,660,398, Nov. 5, 2015, 7 pages.
In The United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.
In The United States Patent and Trademark Office Before the Patent Trial and Appeal Board, Patent Owner's Preliminary Response, *CaptionCall LLC* v. *Ultratec Inc.*, Case IPR2015-00636, U.S. Pat. No. 3,917,822, Jun. 9, 2015, 66 pages.
In The United States Patent and Trademark Office Before the Patent Trial and Appeal Board, Decision Instituting Review, *CaptionCall LLC* v. *Ultratec Inc.*, Case IPR2015-00636, U.S. Pat. No. 8,917,822, Sep. 8, 2015, 20 pages.
In The United States Patent and Trademark Office Before the Patent Trial and Appeal Board, Patent Owner Response, *CaptionCall LLC* v. *Ultratec Inc.*, Case IPR2015-00636, U.S. Pat. No. 8,917,822, Nov. 23, 2015, 65 pages.
In The United States Patent and Trademark Office Before the Patent Trial and Appeal Board, Patent Owner's Contingent Motion to Amend, *CaptionCall LLC* v. *Ultratec Inc.*, Case IPR2015-00636, U.S. Pat. No. 8,917,822, Nov. 23, 2015, 39 pages.
In The United States Patent and Trademark Office Before the Patent Trial and Appeal Board, Petitioner's Reply to Patent Owner Response, *CaptionCall LLC* v. *Ultratec Inc.*, Case IPR2015-00636, U.S. Pat. No. 8,917,822, Jan. 26, 2016, 29 pages.
In The United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In The United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In The United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In The United States Patent and Trademark Office Before the Patent Trial and Appeal Board, Nov. 23, 2015, 5 pages.
In The United States Patent and Trademark Office Before the Patent Trial and Appeal Board, Petition for Inter Partes Review of Claims 1-30 of U.S. Pat. No. 8,908,838, *CaptionCall LLC* v. *Ultratec Inc.*, Case IPR2015-00637, U.S. Pat. No. 8,908,838, Jan. 29, 2015, 67 pages.
In The United States Patent and Trademark Office Before the Patent Trial and Appeal Board, Patent Owner's Preliminary Response, *CaptionCall LLC* v. *Ultratec Inc.*, Case IPR2015-00637, U.S. Pat. No. 8,908,838, Jun. 9, 2015, 65 pages.
In The United States Patent and Trademark Office Before the Patent Trial and Appeal Board, Decision Instituting Review, *CaptionCall LLC* v. *Ultratec Inc.*, Case IPR2015-00637, U.S. Pat. No. 8,908,838, Sep. 8, 2015, 25 pages.
In The United States Patent and Trademark Office Before the Patent Trial and Appeal Board, Patent Owner Response, *CaptionCall LLC* v. *Ultratec Inc.*, Case IPR2015-00637, U.S. Pat. No. 8,908,838, Nov. 23, 2015, 65 pages.
In The United States Patent and Trademark Office Before the Patent Trial and Appeal Board, Patent Owner's Contingent Motion to Amend, *CaptionCall LLC* v. *Ultratec Inc.*, Case IPR2015-00637, U.S. Pat. No. 8,908,838, Nov. 23, 2015, 38 pages.
In The United States Patent and Trademark Office Before the Patent Trial and Appeal Board, Petitioner's Reply to Patent Owner Response, *CaptionCall LLC* v. *Ultratec Inc.*, Case IPR2015-00637, U.S. Pat. No. 8,908,838, Jan. 26, 2016, 29 pages.
In The United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00637, U.S. Pat. No. 8,908,838, Jan. 26, 2016, 28 pages.

(56) References Cited

OTHER PUBLICATIONS

Declaration of Benedict J. Occhiogrosso, In Re: U.S. Pat. No. 8,908,838, Case IPR2015-00637, In The United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In The United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, In The United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, In The United States Patent and Trademark Office Before the Patent Trial and and Appeal Board, Nov. 24, 2015, 61 pages.
Declaration of Katie Kretschman, In Re: U.S. Pat. No. 8,908,838, Case IPR2015-00637, In The United States Patent and Trademark Office Before the Patent Trial and Appeal Board, Nov. 23, 2015, 5 pages.
In The United States Patent and Trademark Office Before the Patent Trial and Appeal Board, Petition for Inter Partes Review of Claims 1-74 of U.S. Pat. No. 9,131,045, *CaptionCall LLC* v. *Ultratec Inc.*, Case IPR2015-01889, U.S. Pat. No. 9,131,045, Sep. 9, 2015, 66 pages.
In The United States Patent and Trademark Office Before the Patent Trial and Appeal Board, Patent Owner's Preliminary Response, *CaptionCall LLC* v. *Ultratec Inc.*, Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, In The United States Patent and Trademark Office Before the Patent Trial and Appeal Board, Sep. 9, 2015, 63 pages.
Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Additional Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Opinion and Order Regarding Claim Construction, Dauber Motions in Limine, and Secondary Considerations of Nonobviousness, *Ultratec, Inc., et al.* v. *Sorenson Communications, Inc., et al.*, Civil Action No. 3:13-cv-00346-BBC, United States District Court, Western District of Wisconsin, Sep. 29, 2014.
Opinion and Order Regarding Motions in Limine and Correcting Errors in Summary Judgment Order, *Ultratec, Inc., et al.* v. *Sorenson Communications, Inc., et al.*, Civil Action No. 3:13-cv-00346-BBC, United States District Court, Western District of Wisconsin, Oct. 1, 2014.
Opinion and Order Regarding Induced Infringement, *Ultratec, Inc., et al.* v. *Sorenson Communications, Inc., et al.*, Civil Action No. 3:13-cv-00346-BBC, United States District Court, Western District of Wisconsin, Oct. 1, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 3, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 8, 2014.
Opinion and Order Regarding Dauber Motions of Secondary Considerations, *Ultratec, Inc., et al.* v. *Sorenson Communications,*
*Inc., et al.*, Civil Action No. 3:13-cv-00346-BBC, United States District Court, Western District of Wisconsin, Oct. 10, 2014.
Joint Stipulation of Dismissal With Prejudice of Claims and Counterclaims Relating to Claims 1-6 of the '835 Patent and Claim 10 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Stipulation Regarding Infringement of Claim 11 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Opinion and Order Regarding Motion for Claims Construction, *Ultratec, Inc., et al.* v. *Sorenson Communications, Inc., et al.*, Civil Action No. 3:13-cv-00346-BBC, United States District Court, Western District of Wisconsin, Oct. 21, 2014.
Special Verdict Regarding Liability, *Ultratec, Inc., et al.* v. *Sorenson Communications, Inc., et al.*, Civil Action No. 3:13-cv-00346-BBC, United States District Court, Western District of Wisconsin, Oct. 23, 2014.
Judgment, *Ultratec, Inc., et al.* v. *Sorenson Communications, Inc., et al.*, Civil Action No. 3:13-cv-00346-BBC, United states District Court, Western District of Wisconsin, Nov. 3, 2014.
Defendants' Rule 50(b) Motion for Judgment of Non-Infringement as a Matter of Law and Rule 59 Motion for New Trial, *Ultratec, Inc., et al.* v. *Sorenson Communications, Inc., et al.*, Civil Action No. 3:13-cv-00346-BBC, United States District Court, Western District of Wisconsin, Nov. 26, 2014.
Defendants' Rule 50(b) Motion for Judgment of Invalidity (Anticipation) and Alternative Rule 59 Motion for New Trial on Anticipation and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 59 Motion for New Trial and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 50(b) Motion for Judgment of Invalidity Obviousness and Alternative Rule 59 Motion for New Trial on Obviousness and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014 (Redacted).
Opinion and Order Regarding Stay of Litigation, *Ultratec, Inc., et al.* v. *Sorenson Communications, Inc., et al.*, Civil Action No. 3:13-cv-00346-BBC, United States District Court, Western District of Wisconsin, May 13, 2015.
Defendants' Answer to Plaintiffs' Second Amended Complaint for Patent Infringement and Counterclaims, *Ultratec, Inc., et al.* v. *Sorenson Communications, Inc., et al.*, Civil Action No. 3:14-cv-00066-BBC, United States District Court, Western District of Wisconsin, May 9, 2014.
Defendants' Notion of Motion and Motion for Summary Judgment Regarding U.S. Pat. No. 7,660,398, *Ultratec, Inc., et al.* v. *Sorenson Communications, Inc., et al.*, Civil Action No. 3:14-cv-00066-JDP, United States District Court, Western District of Wisconsin, Mar. 27, 2015.
Brief No. 1 in Support of Defendants' Motion for Summary Judgment (Indefiniteness and Claim Construction), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 2 in Support of Defendants' Motion for Summary Judgment (Non-Infringement and Invalidity Under 35 USC 102 and 103), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).

(56) References Cited

OTHER PUBLICATIONS

Reply in Support of Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc, et al.*, Civil Action No. 3:14-cv-00066-JDP, United States District Court, Western District of Wisconsin, Jun. 24, 2015 (Redacted).
Claim Construction and Summary Judgment Opinion and Order, *Ultratec, Inc., et al.* v. *Sorenson Communications, Inc., et al.*, Civil Action No. 3:14-cv-00066-JDP, United States District Court, Western District of Wisconsin, Sep. 11, 2015.
Final Pretrial Conference and Order, *Ultratec, Inc., et al.* v. *Sorenson Communications, Inc., et al.*, Civil Action No. 3:14-cv-00066-JDP, United States District Court, Western District of Wisconsin, Sep. 21, 2015.
Order of Plaintiffs' Motion in Limine 16, *Ultratec, Inc., et al.* v. *Sorenson Communications, Inc., et al.*, Civil Action No. 3:14-cv-00066-JDP, United States District Court, Western District of Wisconsin, Sep. 22, 2015.
Order, *Ultratec, Inc., et al.* v. *Sorenson Communications, Inc., et al.*, Civil Action No. 3:14-cv-00066-JDP, United States District Court, Western District of Wisconsin, Oct. 6, 2015.
Special Verdict Form—Liability, *Ultratec, Inc., et al.* v. *Sorenson Communications, Inc., et al.*, Civil Action No. 3:14-cv-00066-JDP, United States District Court, Western District of Wisconsin, Oct. 6, 2015.
Judgment in a Civil Case, *Ultratec, Inc., et al.* v. *Sorenson Communications, Inc., et al.*, Civil Action No. 3:14-cv-00066-JDP, United States District Court, Western District of Wisconsin, Oct. 15, 2015.
Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 8, 2014.
Amended Complaint for Patent Infringement, *Ultratec, Inc., et al.* v. *Sorenson Communications, Inc., et al.*, Civil Action No. 3:14-cv-00847-BBC, United States District Court, Western District of Wisconsin, Dec. 22, 2014.
Defendants' Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Jan. 30, 2015.
Plaintiffs' Answer to Defendants Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' First Amended Answer to Plaintiffs' Amended Complaint for Patent Infringement and Counterclaims, *Ultratec, Inc., et al.* v. *Sorenson Communications, Inc., et al.*, Civil Action No. 3:14-cv-00847-BBC, United States District Court, Western District of Wisconsin, Feb. 20, 2015.
Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 7, 2015.
Parties' Stipulation to a Temporary Stay, *Ultratec, Inc., et al.* v. *Sorenson Communications, Inc., et al.*, Civil Action No. 3:14-cv-00847-BBC, United States District Court, Western District of Wisconsin, Apr. 24, 2015.
Order Granting Defendants' Motion to Stay Pending Inter Partes Review, *Ultratec, Inc., et al.* v. *Sorenson Communications, Inc., et al.*, Civil Action No. 3:14-cv-00847-BBC, United States District Court, Western District of Wisconsin, Apr. 30, 2015.
Joint Notice of IPR Institution and Stipulation to Continue the Stay, *Ultratec, Inc., et al.* v. *Sorenson Communications, Inc., et al.*, Civil Action No. 3:14-cv-00847-BBC, United States District Court, Western District of Wisconsin, Sep. 11, 2015.
In The United States Patent and Trademark Office Before the Patent Trial and Appeal Board, Petition for Inter Partes Review of Claims 1-18 of U.S. Pat. No. 5,974,116, *CaptionCall LLC* v. *Ultratec Inc.*, Case IPR2015-01355, U.S. Pat. No. 5,974,116, Jun. 8, 2015, 65 pages.
In The United States Patent and Trademark Office Before the Patent Trial and Appeal Board, Patent Owner's Preliminary Response, *CaptionCall LLC* v. *Ultratec Inc.*, Case IPR2015-01355, U.S. Pat. No. 5,974,116, Sep. 18, 2015, 43 pages.
In The United States Patent and Trademark Office Before the Patent Trial and Appeal Board, Decision Instituting Review, *CaptionCall LLC* v. *Ultratec Inc.*, Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, In The United States Patent and Trademark Office Before the Patent Trial and Appeal Board, Jun. 8, 2015, 45 pages.
In The United States Patent and Trademark Office Before the Patent Trial and Appeal Board, Petition for Inter Partes Review of Claim 1 of U.S. Pat. No. 6,934,366, *CaptionCall LLC* v. *Ultratec Inc.*, Case IPR2015-01357, U.S. Pat. No. 6,934,366, Jun. 8, 2015, 65 pages.
In The United States Patent and Trademark Office Before the Patent Trial and Appeal Board, Patent Owner's Preliminary Response, *CaptionCall LLC* v. *Ultratec Inc.*, Case IPR2015-01357, U.S. Pat. No. 5,934,366, Sep. 22, 2015, 37 pages.
In The United States Patent and Trademark Office Before the Patent Trial and Appeal Board, Decision Instituting Review, *CaptionCall LLC* v. *Ultratec Inc.*, Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, In The United States Patent and Trademark Office Before the Patent Trial and Appeal Board, Jun. 8, 2015, 46 pages.
In The United States Patent and Trademark Office Before the Patent Trial and Appeal Board, Petition for Inter Partes Review of Claim 1 of U.S. Pat. No. 7,006,604, *CaptionCall LLC* v. *Ultratec Inc.*, Case IPR2015-01358, U.S. Pat. No. 7,006,604, Jun. 8, 2015, 65 pages.
In The United States Patent and Trademark Office Before the Patent Trial and Appeal Board, Patent Owner's Preliminary Response, *CaptionCall LLC* v. *Ultratec Inc.*, Case IPR2015-01358, U.S. Pat. No. 7,006,604, Sep. 22, 2015, 34 pages.
In The United States Patent and Trademark Office Before the Patent Trial and Appeal Board, Decision Instituting Review, *CaptionCall LLC* v. *Ultratec Inc.*, Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, In The United States Patent and Trademark Office Before the Patent Trial and Appeal Board, Jun. 8, 2015, 45 pages.
In The United States Patent and Trademark Office Before the Patent Trial and Appeal Board, Petition for Inter Partes Review of Claims 1-3 and 5-7 of U.S. Pat. No. 6,493,426, *CaptionCall LLC* v. *Ultratec Inc.*, Case IPR2015-01359, U.S. Pat. No. 6,493,426, Jun. 8, 2015, 65 pages.
In The United States Patent and Trademark Office Before the Patent Trial and Appeal Board, Patent Owner's Preliminary Response, *CaptionCall LLC* v. *Ultratec Inc.*, Case IPR2015-01359, U.S. Pat. No. 6,493,426, Sep. 22, 2015, 40 pages.
In The United States Patent and Trademark Office Before the Patent Trial and Appeal Board, Decision Instituting Review, *CaptionCall LLC* v. *Ultratec Inc.*, Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, In The United States Patent and Trademark Office Before the Patent Trial and Appeal Board, Jun. 8, 2015, 47 pages.
In The United States Patent and Trademark Office Before the Patent Trial and Appeal Board, Petition for Inter Partes Review of Claims 1-4 of U.S. Pat. No. 8,515,024, *CaptionCall LLC* v. *Ultratec Inc.*, Case IPR2015-01885, U.S. Pat. No. 8,515,024, Sep. 8, 2015, 35 pages.
In The United States Patent and Trademark Office Before the Patent Trial and Appeal Board, Patent Owner's Preliminary Response,

(56) References Cited

OTHER PUBLICATIONS

*CaptionCall LLC* v. *Ultratec Inc.*, Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, In The United States Patent and Trademark Office Before the Patent Trial and Appeal Board, Sep. 8, 2015, 23 pages.
In The United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC* v. *Ultratec Inc.*, Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, In The United States Patent and Trademark Office Before the Patent Trial and Appeal Board, Sep. 8, 2015, 29 pages.
Complaint for Patent Infringement, *Ultratec, Inc., et al.* v. *Sorenson Communications, Inc., et al.*, Civil Action No. 3:15-cv-00563-JDP, United States District Court, Western District of Wisconsin, Sep. 7, 2015.
Amended Complaint for Patent Infringement, *Ultratec, Inc., et al.* v. *Sorenson Communications, Inc., et al.*, Civil Action No. 3:15-cv-00563-JDP, United States District Court, Western District of Wisconsin, Nov. 12, 2015.
Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 11, 2015.
Defendants' Answer to Plaintiffs' Amended Complaint for Patent Infringement and Counterclaims, *Ultratec, Inc., et al.* v. *Sorenson Communications, Inc., et al.*, Civil Action No. 3:15-cv-00563-JDP, United States District Court, Western District of Wisconsin, Dec. 11, 2015.
Plaintiffs' Response to Defendants' Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 18, 2015.
Order Granting Motion to Stay Pending Inter Partes Review, *Ultratec, Inc., et al.* v. *Sorenson Communications, Inc., et al.*, Civil Action No. 3:15-cv-00563-JDP, United States District Court, Western District of Wisconsin, Dec. 22, 2015.
PCT International Search Report and Written Opinion, PCT/US2006/025236, Oct. 2, 2006.
PCT International Preliminary Report on Patentability, PCT/US2006/025236, Jan. 9, 2008.
PCT International Search Report and Written Opinion, PCT/US2009/040523, Nov. 4, 2009.
Australian Government IP Australia, Examiner's First Report, Application No. 2006263680, Jun. 29, 2009.
Applicant, Response to Jun. 29, 2009 Examiner's First Report, Application No. 2006263680, Jun. 17, 2010.
European Patent Office, Examination Report, Application No. 06785768.0, Aug. 9, 2010.
Applicant, Response to Aug. 9, 2010 Examination Report, Application No. 06785768.0, Dec. 20, 2010.
Opinion and Order, *Ultratec, Inc., et al.* v. *Sorenson Communications, Inc., et al.*, Civil Action No. 13-CV-346-BBC, United States District Court, Western District of Wisconsin, Aug. 28, 2014.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of U.S. Pat. No. 7,660,398, 489 pages.
Vaseghi, Chapter 14: Echo Cancellation, Advanced Digital Signal Processing and Noise Reduction, Second Edition, John Wiley & Sons, Ltd., 2000, pp. 396-415.
Ultratec, Inc. and CapTel, Inc. Complaint for Patent Infringement, *Ultratec, Inc. and CapTel Inc.* v. *Sorenson Dommunications, Inc. and CaptionCall, LLC*, Civil Action No. 14-CV-66, Feb. 3, 2014, 9 pages.
Plaintiffs, Ultratec, Inc. and CapTel, Inc.'s Infringement Contentions, *Ultratec, Inc. and CapTel Inc.* v. *Sorenson Communications, Inc. and CaptionCall, LLC*, Civil Action No. 14-CV-66, Mar. 28, 2014, 9 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
United States Patent and Trademark Office, Office Action Summary and Detailed Action, U.S. Appl. No. 13/486,221, Jan. 28, 2015, 8 pages.
United States Patent and Trademark Office, Office Action Summary and Detailed Action, U.S. Appl. No. 14/506,080, Feb. 27, 2015, 7 pages.
United States Patent and Trademark Office, Office Action Summary and Detailed Action, U.S. Appl. No. 14/299,531, Sep. 19, 2014, 8 pages.
Applicant, Amendment (Response to Sep. 19, 2014, Office Action), U.S. Appl. No. 14/299,531, Sep. 24, 2014, 12 pages.
United States Patent and Trademark Office, Office Action Summary and Detailed Action, U.S. Appl. No. 14/299,531, Oct. 10, 2014, 6 pages.
Applicant, Response (Response to Oct. 10, 2014, Office Action), U.S. Appl. No. 14/299,531, Oct. 17, 2014, 3 pages.
United States Patent and Trademark Office, Office Action Summary and Detailed Action, U.S. Appl. No. 14/299,651, Oct. 16, 2014, 5 pages.
Applicant, Response (Response to Oct. 16, 2014, Office Action), U.S. Appl. No. 14/299,651, Oct. 17, 2014, 3 pages.
United States Patent and Trademark Office, Office Action Summary and Detailed Action, U.S. Appl. No. 13/950,860, Sep. 3, 2014, 9 pages.
Applicant, Amendment (Response to Sep. 3, 2014, Office Action), U.S. Appl. No. 13/950,860, Mar. 3, 2015, 11 pages.
United States Patent and Trademark Office, Office Action Summary and Detailed Action, U.S. Appl. No. 13/950,860, Apr. 2, 2015, 8 pages.
PCT International Search Report, Application No. PCT/US93/04753, Aug. 20, 1993.
European Patent Office, Supplementary European Search Report, Application No. EP 93911360 (Patent No. EP 0596078), Mar. 27, 1995.
European Patent Office, Communication, Application No. EP 93911360.1 (Patent No. EP 0596078), Jul. 10, 1998.
Applicant, Response to Jul. 10, 1998 Communication, Application No. EP 93911360.1 (Patent No. EP 0596078), Jan. 20, 1999.
European Patent Office, Communication, Application No. EP 93911360.1 (Patent No. EP 0596078), Jun. 16, 1999.
United States Patent and Trademark Office, Notice of Allowance, Examiner's Amendment, Examiner Interview Summary Record, U.S. Appl. No. 08/129,894 (U.S. Pat. No. 5,432,837), Dec. 29, 1994.
United States Patent and Trademark Office, Examiner's Action, U.S. Appl. No. 08/155,061 (U.S. Pat. No. 5,517,548), Dec. 22, 1994.
Applicant, Amendment (Response to Dec. 22, 1994 Office Action), U.S. Appl. No. 08/155,061 (U.S. Pat. No. 5,517,548), Jun. 22, 1995.
United States Patent and Trademark Office, Notice of Allowance, U.S. Appl. No. 08/155,061 (U.S. Pat. No. 5,517,548), Aug. 8, 1995.
European Patent Office, Supplementary European Search Report, Application No. EP 93911361.9 (Patent No. EP 0596079), Mar. 27, 1995.
European Patent Office, Communication, Application No. EP 93911361.9 (Patent No. EP 0596079), Jul. 10, 1998.
Applicant, Response to Jul. 10, 1998 Communication, Application No. EP 93911361.9 (Patent No. EP 0596079), Jan. 20, 1999.
PCT International Search Report, Application No. PCT/US93/04760, Aug. 13, 1993.
United States Patent and Trademark Office, Communication, U.S. Appl. No. 07/886,552, May 21, 1993.
United States Patent and Trademark Office, Office Action Summary and Detailed Action, U.S. Appl. No. 08/802,053, Sep. 30, 1997.
Applicant, Response to Sep. 30, 1997 First Office Action, U.S. Appl. No. 08/802,053, Oct. 20, 1997.

(56) References Cited

OTHER PUBLICATIONS

United States Patent and Trademark Office, Office Action Summary and Detailed Action, U.S. Appl. No. 08/802,053, Jan. 5, 1998.
Applicant, Amendment After Final (Jan. 5, 1998 Office Action), U.S. Appl. No. 08/802,053, Feb. 6, 1998.
United States Patent and Trademark Office, Advisory Action, U.S. Appl. No. 08/802,053, Feb. 20, 1998.
Applicant, Appellant's Brief on Appeal, U.S. Appl. No. 08/802,053, May 29, 1998.
United States Patent and Trademark Office, Examiner's Answer, U.S. Appl. No. 08/802,053, Aug. 18, 1998.
United States Patent and Trademark Office, Decision on Appeal, U.S. Appl. No. 08/802,053, Oct. 19, 2001.
United States Patent and Trademark Office, Examiner's Action, U.S. Appl. No. 08/258,044 (U.S. Pat. No. 5,604,786), Jun. 21, 1995.
Applicant, First Amendment (Response to Jun. 21, 1995 Office Action), U.S. Appl. No. 08/258,044 (U.S. Pat. No. 5,604,786), Sep. 8, 1995.
United States Patent and Trademark Office, Communication, U.S. Appl. No. 08/258,044 (U.S. Pat. No. 5,604,786), Dec. 14, 1995.
Applicant, Second Amendment, U.S. Appl. No. 08/258,044 (U.S. Pat. No. 5,604,786), Jun. 14, 1996.
Applicant, Third Amendment, U.S. Appl. No. 08/258,044 (U.S. Pat. No. 5,604,786), Jul. 31, 1996.
United States Patent and Trademark Office, Notice of Allowance, U.S. Appl. No. 08/258,044 (U.S. Pat. No. 5,604,786), Aug. 7, 1996.
United States Patent and Trademark Office, Supplemental Notice of Allowability and Examiner's Amendment, U.S. Appl. No. 08/258,044 (U.S. Pat. No. 5,604,786), Nov. 18, 1996.
United States Patent and Trademark Office, Communication, U.S. Appl. No. 08/369,205 (U.S. Pat. No. 5,581,593), Nov. 2, 1995.
Applicant, Amendment (Response to Nov. 2, 1995 Office Action), U.S. Appl. No. 08/369,205 (U.S. Pat. No. 5,581,593), Feb. 5, 1996.
United States Patent and Trademark Office, Notice of Allowance, Interview Summary, and Examiner's Amendment, U.S. Appl. No. 08/369,205 (U.S. Pat. No. 5,581,593), May 15, 1996.
PCT International Search Report, Application No. PCT/US96/00282, Apr. 9, 1996.
United States Patent and Trademark Office, Office Action Summary and Detailed Action, U.S. Appl. No. 08/481,852 (U.S. Pat. No. 5,978,654), Sep. 5, 1996.
Applicant, Amendment (Response to Sep. 5, 1996 Office Action), U.S. Appl. No. 08/481,852 (U.S. Pat. No. 5,978,654), Nov. 26, 1997.
United States Patent and Trademark Office, Office Action Summary and Detailed Action, U.S. Appl. No. 08/481,852 (U.S. Pat. No. 5,978,654), Oct. 16, 1998.
Applicant, Response (to Oct. 16, 1998 Office Action), U.S. Appl. No. 08/481,852 (U.S. Pat. No. 5,978,654), Apr. 16, 1999.
United States Patent and Trademark Office, Notice of Allowance, U.S. Appl. No. 08/481,852 (U.S. Pat. No. 5,978,654), May 5, 1999.
PCT International Search Report, U.S. Appl. No. PCT/US96/09391, Aug. 27, 1996.
United States Patent and Trademark Office, Office Action Summary and Detailed Action, U.S. Appl. No. 09/288,420 (U.S. Pat. No. 6,233,314), Feb. 25, 2000.
Applicant, Amendment (Response to Feb. 25, 2000 Office Action) and Terminal Disclaimer, U.S. Appl. No. 09/288,420 (U.S. Pat. No. 6,233,314), Aug. 25, 2000.
United States Patent and Trademark Office, Notice of Allowance, U.S. Appl. No. 09/288,420 (U.S. Pat. No. 6,233,314), Dec. 5, 2000.
United States Patent and Trademark Office, Office Action Summary and Detailed Action, U.S. Appl. No. 09/783,337 (U.S. Pat. No. 6,493,426), Dec. 14, 2001.
Applicant, Response to Dec. 14, 2001 Office Action and Terminal Disclaimer, U.S. Appl. No. 09/783,337 (U.S. Pat. No. 6,493,426), Jun. 14, 2002.
United States Patent and Trademark Office, Notice of Allowance and Examiner's Statement of Reasons for Allowance, U.S. Appl. No. 09/783,337 (U.S. Pat. No. 6,493,426), Jul. 25, 2002.
United Kingdom Patent Office, Examination Report, Application No. GB 0319142.6 (Patent No. GB 2389993), Jan. 13, 2004.
Canadian Intellectual Property Office, Examiner's Report, Application No. CA 2,438,412, May 20, 2009.
Applicant, Response to May 20, 2009 Official Action, Application No. CA 2,438,412, Nov. 18, 2009.
Canadian Intellectual Property Office, Notice of Allowance, Application No. CA 2,438,412, Apr. 30, 2010.
United States Patent and Trademark Office, Notice of Allowance, Examiner's Amendment, Examiner Interview Summary Record, U.S. Appl. No. 07/074,625 (U.S. Pat. No. 4,777,469), May 20, 1988.
Canadian Patent Office, Notice of Allowance, Application No. CA 571,452 (Patent No. 1,301,388), Jan. 29, 1991.
Applicant, Restoration and Amendment, Application No. CA 571,452 (Patent No. 1,301,388), Aug. 8, 1991.
United States Patent and Trademark Office, Communication, U.S. Appl. No. 07/224,118 (U.S. Pat. No. 4,897,868), Jun. 8, 1989.
Applicant, Amendment (Response to Jun. 8, 1989 Office Action) and Terminal Disclaimer, U.S. Appl. No. 07/224,118 (U.S. Pat. No. 4,897,868), Jun. 19, 1989.
United States Patent and Trademark Office, Notice of Allowance, U.S. Appl. No. 07/224,118 (U.S. Pat. No. 4,897,868), Aug. 29, 1989.
United States Patent and Trademark Office, Communication, U.S. Appl. No. 07/334,003 (U.S. Pat. No. 4,959,847), Oct. 10, 1989.
Applicant, Amendment (Response to Oct. 10, 1989 Office Action), U.S. Appl. No. 07/334,003 (U.S. Pat. No. 4,959,847), Jan. 10, 1990.
United States Patent and Trademark Office, Notice of Allowance, U.S. Appl. No. 07/334,003 (U.S. Pat. No. 4,959,847), Mar. 27, 1990.
United Kingdom Patent Office, Examiner's Search Report, Application No. GB 9006994.9 (Patent No. GB 2,231,468), Jul. 12, 1990.
United Kingdom Patent Office, Examiner's Report, Application No. GB 9006994.9 (Patent No. GB 2,231,468), Dec. 16, 1992.
Applicant, Response to Dec. 16, 1992 Official Letter, Application No. GB 9006994.9 (Patent No. GB 2,231,468), Jun. 11, 1993.
Canadian Intellectual Property Office, Examination Report, Application No. CA 2,013,617, Jul. 28, 2000.
Applicant, Response to Jul. 28, 2000 Official Action, Application No. CA 2,013,617, Nov. 28, 2000.
Applicant, Information Letter, Application No. CA 2,013,617, Feb. 1, 2001.
Canadian Intellectual Property Office, Notice of Allowance, Application No. CA 2,013,617, Mar. 23, 2001.
United States Patent and Trademark Office, Communication, U.S. Appl. No. 07/842,943 (U.S. Pat. No. 5,351,288), Oct. 22, 1993.
Applicant, Amendment (Response to Oct. 22, 1993 Office Action) and Terminal Disclaimer, U.S Appl. No. 07/842,943 (U.S. Pat. No. 5,351,288), Jan. 13, 1994.
United States Patent and Trademark Office, Communication, U.S. Appl. No. 07/842,943 (U.S. Pat. No. 5,351,288), Mar. 30, 1994.
Applicant, Response to Mar. 30, 1994 Final Rejection, U.S. Appl. No. 07/842,943 (U.S. Pat. No. 5,351,288), Apr. 12, 1994.
Applicant, Supplemental Response to Final Rejection and Terminal Disclaimer, U.S. Appl. No. 07/842,943 (U.S. Pat. No. 5,351,288), Apr. 28, 1994.
United States Patent and Trademark Office, Notice of Allowance, U.S. Appl. No. 07/842,943 (U.S. Pat. No. 5,351,288), Jun. 6, 1994.
United States Patent and Trademark Office, Communication, U.S. Appl. No. 07/255,357, May 3, 1989.
Applicant, Amendment (Response to May 3, 1989 Office Action), U.S. Appl. No. 07/255,357, Aug. 3, 1989.
United States Patent and Trademark Office, Communication, U.S. Appl. No. 07/255,357, Oct. 16, 1989.
Applicant, Amendment (Response to Oct. 16, 1989 Office Action), U.S. Appl. No. 07/255,357, Apr. 16, 1990.
United States Patent and Trademark Office, Communication, U.S. Appl. No. 07/255,357, Jul. 16, 1990.
Applicant, Response After Final, U.S. Appl. No. 07/255,357, Oct. 16, 1990.
United States Patent and Trademark Office, Advisory Action, U.S. Appl. No. 07/255,357, Nov. 6, 1990.

(56) References Cited

OTHER PUBLICATIONS

United States Patent and Trademark Office, Examiner's Action, U.S. Appl. No. 07/886,553 (U.S. Pat. No. 5,325,417), May 21, 1993.
Applicant, First Amendment (Response to May 21, 1993 Office Action), U.S. Appl. No. 07/886,553 (U.S. Pat. No. 5,325,417), Oct. 21, 1993.
United States Patent and Trademark Office, Notice of Allowance, U.S. Appl. No. 07/886,553 (U.S. Pat. No. 5,325,417), Jan. 4, 1994.
European Patent Office, Communication, Application No. EP 93911359.3 (Patent No. EP 0608389), Jul. 10, 1998.
Applicant, Response to Jul. 10, 1998 Communication, Application No. EP 93911359.3 (Patent No. EP 0608389), Jan. 19, 1999.
Canadian Intellectual Property Office, Notice of Allowance, Application No. CA 2,113,841, Jun. 10, 2002.
PCT International Search Report, Application No. PCT/US93/04751, Aug. 18, 1993.
United States Patent and Trademark Office, Examiner's Action, U.S. Appl. No. 29/024,266 (U.S. Pat. No. D. 364,865), Mar. 30, 1995.
Applicant, Response to First Office Action, U.S. Appl. No. 29/024,266 (U.S. Pat. No. D. 364,865), May 16, 1995.
United States Patent and Trademark Office, Notice of Allowance, U.S. Appl. No. 29/024,266 (U.S. Pat. No. D. 364,865), Jun. 7, 1995.
United States Patent and Trademark Office, Office Action Summary and Detailed Action, U.S. Appl. No. 29/076,383 (U.S. Pat. No. D. 405,793), Apr. 14, 1998.
Applicant, First Amendment (Response to Apr. 14, 1998 Office Action), U.S. Appl. No. 29/076,383 (U.S. Pat. No. D. 405,793), Jul. 14, 1998.
United States Patent and Trademark Office, Notice of Allowance and Examiner's Amendment, U.S. Appl. No. 29/076,383 (U.S. Pat. No. D. 405,793), Aug. 10, 1998.
Applicant, Preliminary Response to United States Patent and Trademark Office, U.S. Appl. No. 07/616,720 (U.S. Pat. No. 5,081,673), Dec. 31, 1990.
United States Patent and Trademark Office, Notice of Allowance, U.S. Appl. No. 07/616,720 (U.S. Pat. No. 5,081,673), Mar. 7, 1991.
Canadian Intellectual Property Office, Notice of Allowance, Patent No. CA 1320602, Oct. 27, 1992.
United States Patent and Trademark Office, Examiner's Action, U.S. Appl. No. 07/886,642 (U.S. Pat. No. 5,327,479), May 19, 1993.
Applicant, First Amendment (Response to May 19, 1993 Office Action), U.S. Appl. No. 07/886,642 (U.S. Pat. No. 5,327,479), Oct. 19, 1993.
United States Patent and Trademark Office, Notice of Allowance and Examiner Interview Summary Record, U.S. Appl. No. 07/886,642 (U.S. Pat. No. 5,327,479), Jan. 5, 1994.
Canadian Intellectual Property Office, Notice of Allowance, Application No. CA 2,113,839, Jun. 18, 2002.
Cooper, R. J., Break Feature for Half-Duplex Modem, IBM Technical Disclosure Bulletin, vol. 17, No. 8, pp. 2386-2387, Jan. 1975.
Gopalakrishnan, Effective Set-Up for Performing Phone Conversations by the Hearing Impaired, IBM Technical Disclosure Bulletin, vol. 34, No. 78, pp. 423-426, 1991.
Moskowitz, Telocator Alphanumeric Protocol, Version 1.8, Feb. 4, 1997.
Smith, R. L., ASCII to Baudot, Radio Electronics, pp. 51-58, Mar. 1976.
Applicant, Response to Apr. 10, 2012 Official Action, Canadian Application No. 2,556,933, Jul. 12, 2012.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
United States Patent and Trademark Office, Communication, U.S. Appl. No. 12/686,688, Nov. 8, 2012.
Final Office Action issued for U.S. Appl. No. 15/010,179, dated Jan. 30, 2018, 15 pages.
Final Office Action issued for U.S. Appl. No. 14/988,407, dated Feb. 9, 2018, 15 pages.

\* cited by examiner

SYSTEM FOR TEXT ASSISTED TELEPHONY

CROSS-REFERENCE TO RELATED APPLICATIONS

This application is a continuation of U.S. patent application Ser. No. 14/506,080, filed Oct. 3, 2014, which is a continuation of U.S. patent application Ser. No. 13/486,205, filed Jun. 1, 2012, and issued as U.S. Pat. No. 9,131,045 on Sep. 8, 2015, which is a continuation of U.S. patent application Ser. No. 11/955,476, filed Dec. 13, 2007, and issued as U.S. Pat. No. 8,213,578 on Jul. 3, 2012, which is a continuation of U.S. patent application Ser. No. 11/257,703, filed Oct. 25, 2005, and issued as U.S. Pat. No. 7,319,740 on Jan. 15, 2008, which is a continuation of U.S. patent application Ser. No. 10/634,965, filed Aug. 5, 2003, and issued as U.S. Pat. No. 7,003,082 on Feb. 21, 2006, which is a continuation of U.S. patent application Ser. No. 09/938,194, filed on Aug. 23, 2001, and issued as U.S. Pat. No. 6,603,835 on Aug. 5, 2003.

STATEMENT REGARDING FEDERALLY SPONSORED RESEARCH OR DEVELOPMENT

Not applicable.

BACKGROUND OF THE INVENTION

The present invention relates to the general field of telephone communications. In more particular, the invention relates to systems to assist telephone communications by those persons who are deaf, hard of hearing, or otherwise have impaired hearing capability.

Most modern human communications in both social and business environments takes place through sound communications. Yet within modern society there are many persons who have attenuated hearing capability. To assist those persons in making use of our telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a key board and a display as well as a specific type of modem, to acoustically or directly couple to the telephone line. Modern TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology based on digital electronic components. Accordingly, the Baudot protocol was constructed for a set of constraints which are no longer relevant to present date devices. The original Baudot protocol was a unidirectional or simplex system of communication conducted at 45.5 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate from voice to digital electronic forms of communication.

A system to assist users of the telephone system who are hard of hearing but not deaf has been described. This system, sometimes referred to as text enhanced telephony, makes use of the existence of relays to supplement telephone communications for users who can hear, but have attenuated hearing capabilities. This systems includes, in its simplest embodiment, a visually readable display connected in series between the telephone used by the assisted user and the connection to the telephone network. The text enhanced telephone call is connected through a relay which transmits both the voice of the hearing user at the other end and a text stream of the words spoken by that user on the same telephone line. The details of the concept and of some embodiments of that system are disclosed in U.S. Pat. No. 6,075,842, the disclosure of which is hereby incorporated by reference.

BRIEF SUMMARY OF THE INVENTION

The present invention is summarized in that a relay system to facilitate the translation of information and communication between deaf and hearing persons includes a call assistant who re-voices the words of the hearing person which are spoken to the call assistant. The words spoken by the call assistant are recognized by a speech recognition computer program which has been trained to the voice pattern of the call assistant, such that the words are promptly translated into a high speed digital communication protocol. That high speed digital communication message is then transmitted electronically promptly by telephone to a visual display accessible to the deaf person.

It is an advantage of the invention described herein that the call assistant does not have to type most, if any, of the words spoken by the hearing person in the communication session so that the overall speed of communications from the hearing person to the deaf person is dramatically increased.

It is an object of the present invention that the design and utilization of a relay operated in accordance with the protocols described herein permits the introduction of small hand-held personal interpreter which will enable on the spot communications between deaf persons and hearing persons wherever the deaf persons might go.

DETAILED DESCRIPTION OF THE INVENTION

Figure 1:
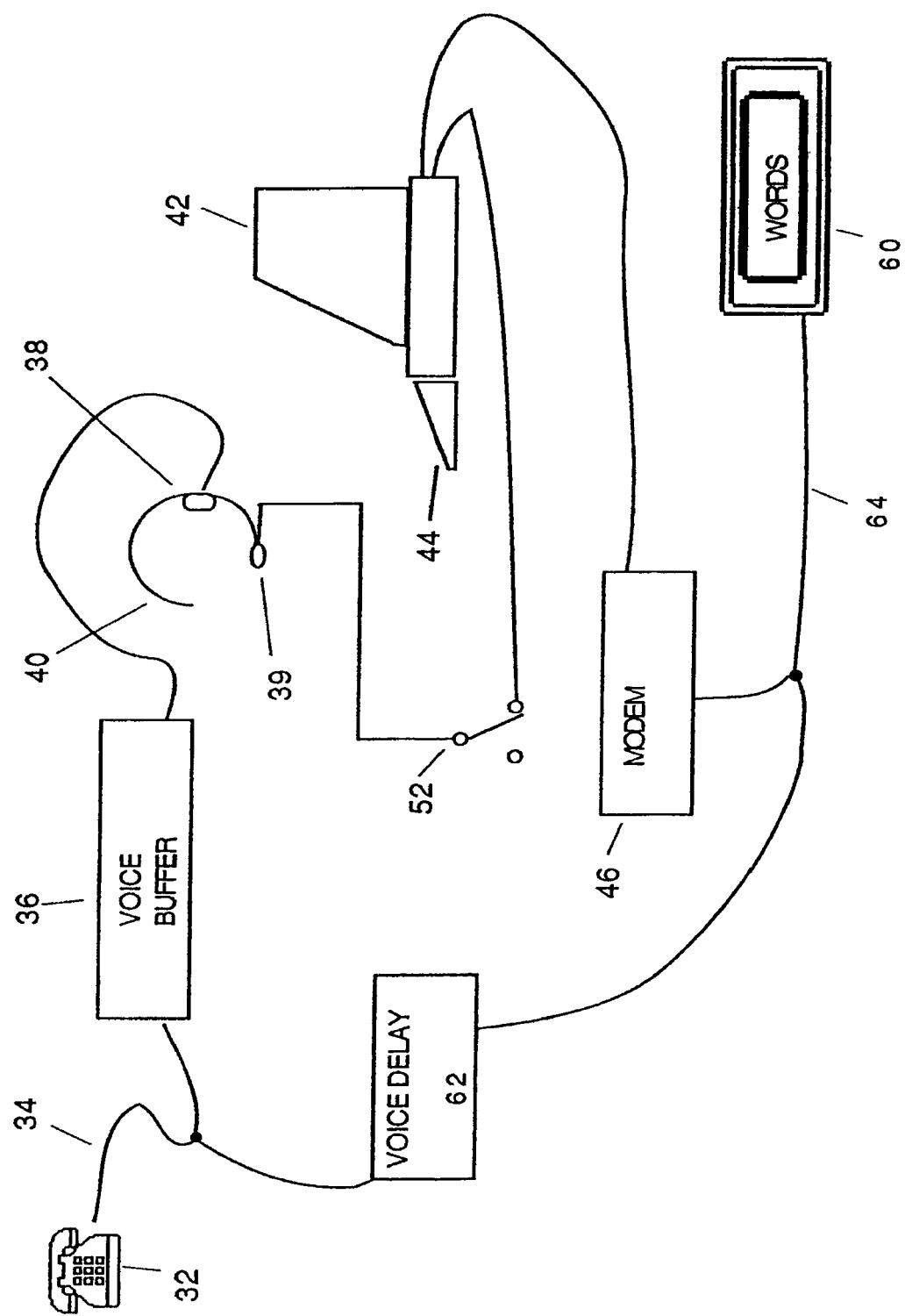
FIG. 1 is a schematic block diagram of a re-voicing relay.

The present invention is intended to provide an alternative arrangement for the delivery of text assisted telephone services, also called captioned telephone, to a telephone system user with diminished hearing. The present system is intended to take advantage of two developments in the field of assisted telephone services, the personal interpreter and the re-voicing relay. The arrangement for using these capabilities here is designed not to provide text services for the profoundly deaf, but to provide a text assistance service for those who can hear, but who may have diminished hearing. This service is designed to supplement rather than replace the transmission of the spoken voice word to the assisted user. To assist understanding what is contemplated here, the basic technologies of the personal interpreter and the re-voicing relay will be described here first, after which the description will return to the main topic, text assisted telephone services or, as they are also known, captioned telephone services.

The personal interpreter is intended to be a small portable device capable of delivering, with the support of a relay, text to a deaf user of any human conversation occurring in the presence of the personal interpreter. The personal interpreter is set up to connect telephonically to a relay, transmit spoken words to the relay, and then display for the assisted user the text of the words transmitted over the telephone connection to the relay. To make the personal interpreter work more seamlessly to produce more conversation-like communication, a faster relay methodology was needed. To fill this need, the re-voicing relay was designed.

The re-voicing relay is based upon the underlying technology of using voice recognition software, operated by a call assistant (a "CA"), to assist in the voice to text translation inherent in providing relay services. The re-voicing strategy is described in U.S. Pat. No. 5,909,482, the disclosure of which is hereby incorporated by reference. The re-voicing relay has its first implementation in providing voice to text transcription services for the deaf. However, the relay voice to text transcription service has use for users other than those who are deaf. It is envisioned that there are a number of hearing or partially hearing users who would have reason to benefit from voice to text transcription services. Relay voice to text service might also be useful for any application in which it is desired to supplement voice communications by a text transcription of the voice spoken on the telephone. Thus, while the operation of the relay will sometimes be described here by referring to an "assisted user," who may be deaf or hard of hearing, but who also may be a normally hearing person who simply wants text assistance for some reason. The user at the other end of the line will be referred to here as the hearing user, simply for the purpose of having something to call that person, even though both users may be hearing.

Personal Interpreter.

Figure 2:
FIG. 2 is an exterior view of a personal interpreter enabled by the relay of FIG. 1.

Shown in FIG. 2 is an illustration of what a personal interpreter 10 can look like. This would be a small hand held device typically the size of a small hardbound book. It would have a keyboard of minimal size, but useable by a deaf person who can type. It would have a two or four line display, but the display could be any size that conveniently fits in the case of the device. The device would also have a key or switch which would initiate its operation.

Shown in FIG. 2 is a schematic block diagram of the internal mechanics of the personal interpreter. The personal interpreter keyboard shown at 12 and its display as shown at 14. Inside the interpreter itself is a microprocessor shown at 16. Not shown, but included within the personal interpreter, would be the appropriate memory and interface devices so as to allow the microprocessor to be programmed and to operate the personal interpreter and perform its functions, in a manner well known in the art. Also inside of the personal interpreter is a modem 18. The modem 18 is preferably a modem specifically designed for interface with the deaf telecommunications system. Most telecommunications with the deaf community are conducted using a Baudot type code. One useful alternative is for the modem be designed to use the enhanced form of Baudot communication known as "Turbo Code" (Ultratec), which is generally described in U.S. Pat. No. 5,432,837, No. 5,517,548, and 5,327,479, the disclosure of which is hereby incorporated by reference. Another alternative is that the modem use a new variant of Turbo Code, one which uses higher carrier frequencies (in the range of 3000-3500 hertz) and a faster baud rate (over 100 baud). The most preferred alternative is for the modem to use a digital communication protocol which can both transmit and receive digital packets which contain either or both of voice and text. The output of the modem is preferably wired to a cellular telephone 20 included within the case of the personal interpreter 10. The cellular telephone 20 has a suitable antenna provided on it so that it may dial a cellular telephone network by radio frequency communications of the type normally conducted by cellular telephones. The personal interpreter also includes jack 28 to connect to a conventional wired or land-line telephone line as well. The personal interpreter also includes a microphone 22 and a speaker 24. A filter 26 connects the speaker 24 and the microphone 22 to the telephone 20.

A brief description of the operation and functionality of the personal interpreter reveals the dramatic improvement and convenience and portability that this device gives to text assisted people. A assisted user could go into an establishment, be it a government office or retail facility, in which there are only hearing persons. The assisted person would carry with him or her the personal interpreter 10. The assisted user would then place the personal interpreter 10 upon a counter or other surface, open it up, and press the initiation key or start button. The microprocessor 16 and modem 18 of the personal interpreter then power up and act in many ways like a normal TDD device operating in telecommunication standard, such as Turbo code. However, there is one critical difference. The start or initiation key further causes the microprocessor 16 of the personal interpreter to dial a relay to set up a relay communication session and includes in its communication with the relay a message, using the enhanced command features available in advanced telecommunication protocols, such as Turbo Code, to initiate a special format of relay call adapted for the personal interpreter. Other codes which permit command functions, such as ASCII or CCITT, could also be used. The first operation is to activate the cellular telephone and direct the cellular telephone to dial the number of a relay operating in accordance with the method of the present invention. The cellular telephone dials the relay. Obviously, no wired connection is required to allow the cellular telephone function to establish a telephone connection with the remote relay, but alternatively the jack 28 to a conventional telephone line could be used. In addition, when the relay answers the telephone connection, the microprocessor 16 of the personal interpreter 10 is instructed to provide command codes to the remote relay. These command codes, a feature possible through the use of Turbo Code, permits the personal interpreter to tell the relay that this is a personal interpreter-type relay communication session. All of this can happen in the time necessary to initiate the cellular call, perhaps two to ten seconds.

Then, the assisted person can use the personal interpreter to translate words spoken by hearing persons in the presence of the personal interpreter into visually readable text. This is done by the personal interpreter 10 through an unseen relay. Words spoken by the hearing persons in the presence of the personal interpreter 10 are picked up by the microphone 22. Those words are then transmitted through the cellular telephone 20 to the remote relay. The relay, operating as will be described below, then immediately transmits back, in enhanced Turbo Code, a digital communication stream translating the words that were just spoken. The words are received by the modem 18, and the microprocessor 16 in the personal interpreter 10, and it is displayed promptly upon the display screen 14. If the assisted person can speak, he or she may then answer the hearing person with a spoken voice, or, the assisted person may alternatively type upon the keyboard 12. If the assisted user types on the keyboard 12, the personal interpreter transmits the communication by digital communication to the relay. The call assistant at the relay then reads and speaks the words typed by the assisted user which are transmitted to the speaker 22 contained in the personal interpreter into a voice communication which can be understood by the hearing users. The filter 26 filters out the digital communication frequencies from the sound generated by the speaker 22. Thus, in essence, the assisted person has a personal interpreter available to him or her at all times of the day or night wherever the assisted person is within the range of the cellular telephone system. Also, because the relay is preferably operating in accordance with the fast translation methodology described below, a very conversation-like feel can occur in the communication session between the assisted user and the hearing persons in the presence of the personal interpreter 10. In order for this communication session to be satisfactory to the hearing users as well as the assisted person, however, the relay must operate exceedingly rapidly. It is, in part, to meet the need for the exceeding rapidity of this conversational style of communication that the re-voicing relay protocol has been designed.

Re-Voicing Relay.

Figure 3:
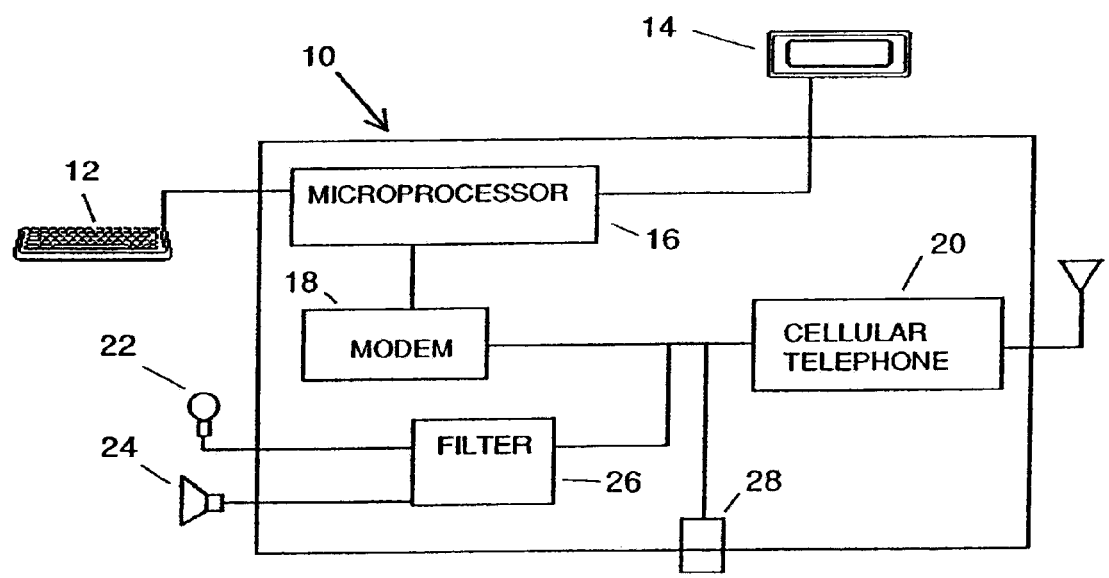
FIG. 3 is a schematic block diagram of the personal interpreter of FIG. 2.

Shown in FIG. 1 is a relay intended to provide the voice to text capability to support the personal interpreter, and which can also support other voice to text services to provide services for assisted users. FIG. 1 is intended to show, in schematic fashion, how such a relay system can be set up. Shown at 32 is a telephone of a hearing person. Instead of a telephone of a hearing person, the input could also be the microphone of the personal interpreter 10 shown in FIGS. 2 and 3. The telephone of the hearing person 32 is connected through a telephone line 34 to a voice input buffer 36 at the relay. The telephone line 34 can be an actual physical land line, or two pair between the telephones, or can be a cellular or other over-the-air telephone linkage. The voice input buffer 36 is a simple buffer to ensure temporary capture of the voice in the event that the call assistant gets behind and needs to buffer or delay the voice of the hearing person. In any event, the output of the input voice buffer 36 is provided to a headset 40 where earphones 38 produce the sound of the remote speaking person in the ear of the call assistant. The call assistant is wearing the headset 40 and sitting at a computer 42 capable of communicating in an enhanced Baudot communication, such as Turbo Code or whatever other code protocol is being used. However, typically the call assistant does not type the words which the call assistant hears in his or her earphone 38. Instead, the call assistant then speaks the words which he or she hears in the earphones 38 into a microphone 39 in the headset 40. The microphone 39 on the headset 40 is connected to transmit the voice of the call assistant to the computer 42 at which the call assistant sits.

Captioned Telephone.

As mentioned earlier, captioned telephone is a technology intended to provide text assistance to assisted user during the course of a voice telephone communication session. As will become apparent from the discussion below, a captioned telephone connection can be a single line connection or a multiple line connection. There are advantages and disadvantages of each approach. A single line connection is known in the art, as exemplified by U.S. Pat. No. 6,075,842, mentioned previously. The advantages and details of the use of a multiple line connection are described below. The discussion of captioned telephone will begin with a single line connection.

Figure 4:
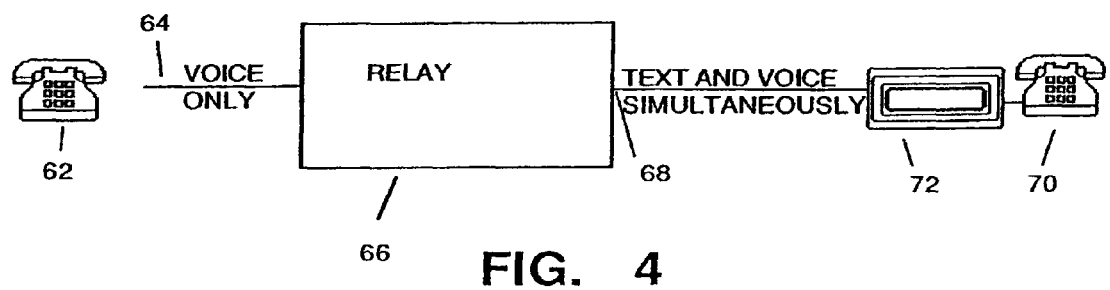
FIG. 4 illustrates the operation of a captioned telephone service supported by a relay.

Shown in FIG. 4 is an illustration of how a typical telephone call involving a single line captioned telephone would be set up. The hearing user at telephone 62 communicates through a telephone line 64 with the relay, indicated at 66. The relay, a re-voicing relay, communicates through a telephone line 68 with the assisted user. At the site of the assisted user is a telephone 70 used by the assisted user and also a captioned telephone device 72. The telephone 70 is conventional. The captioned telephone device 72 is constructed to accomplish two objectives. One objective is to filter, or separate, the digital signals carrying the text information from the voice signal. The other objective is to take the digital signals and create a visual display of the text information for the assisted user. This device is thus intended to assist the user to understand a greater portion of the conversation by providing a visually readable transcription of the text of the telephone conversation so that the assisted user can read any words that he or she cannot hear properly. While the captioned telephone device 72 of FIG. 4 is illustrated as a separate stand-alone device from the telephone 70, those of skill in the art can readily appreciate that the two functions can be combined in a special capability telephone station. Such a special purpose station can both provide conventional telephone service and also include a display which can be used to provide captioning for an assisted user.

Figure 5:
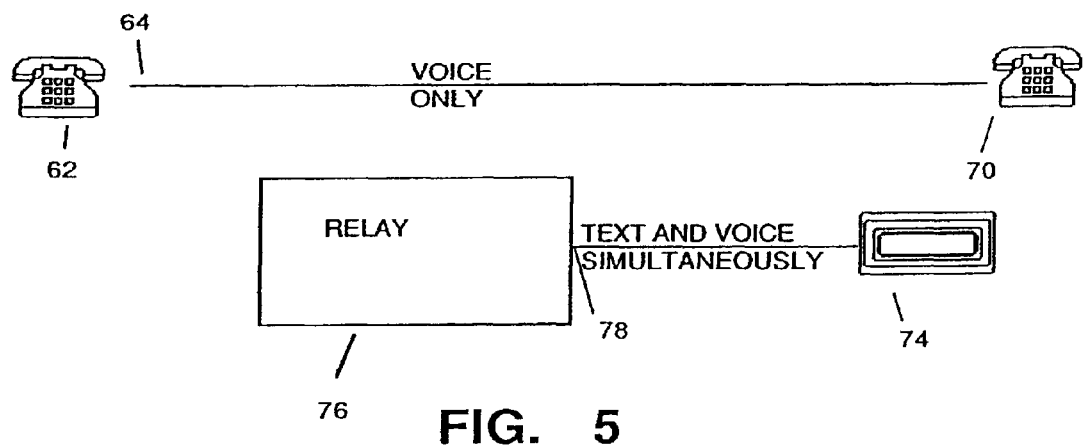
FIG. 5 is a schematic illustration of the concept of the two wire captioned telephone device connection with sound inter-connection.

The two line captioned telephone is indicated in FIG. 5. In its simplest embodiment, the two-line captioned telephone can be conceptually thought of as a personal interpreter used to provide text assistance to a telephone user. Thus in FIG. 5, the telephone of the hearing user 62 and the telephone of the assisted user 70 are connected directly by a simple single telephone connection, indicated by the telephone line 64. The assisted user then uses a personal interpreter/captioned telephone ("PICT") device 74 to connect to a relay 76 over a second telephone line or connection, indicated at 78. There must be some form of communication between the telephone of the assisted user 70 and the PICT device 74, so that the voice of the hearing user can be transferred to the second telephone line 78 to the relay 76. At its simplest, the connection can be a simple acoustic connection, such as placing the sound pick-up microphone of the PICT device in such a location that the sound of the hearing person's voice is picked up and transmitted to the relay. A microphone connected to the PICT device 74 could be placed on the handset of the assisted user's telephone 70. However, it is preferred that the PICT device be electronically connected to the telephone of the assisted user so that the voice of the hearing user can be transmitted to the relay call assistant with minimal interference or noise. The PICT device includes a visually readable display and suitable decoding electronics and software so that the device can receive and display a text stream received from the relay over the second telephone line.

The main advantage of the two-line approach to captioned telephone is that the captioned telephone service can be added to a telephone call already in progress. By contrast, to use single line captioned telephone for an incoming call, the call must be directed through the relay to the assisted user at the beginning of the call. For a two-line captioned telephone call, however, the call can be started as a normal telephone communication session, without the relay or the captioning. Then, if the assisted user decides captioning would be helpful to his or her understanding of the conversation, the captioning service can be added while the call is in progress. To add the captioning service, the assisted user simply has the PICT device dial the relay over the second telephone line. The voice of the hearing user is then transmitted over the second telephone line to the relay. The relay converts the voice to text and the text stream created by the relay returns to the assisted user, also over the second telephone line. Note that in this arrangement, as indicated in FIG. 5, voice and text are transmitted in opposite directions over a single telephone line between the PICT device and the relay, voice going to the relay and text returning on the same line. This arrangement of voice and text is the same as used for the personal interpreter.

Figure 6:
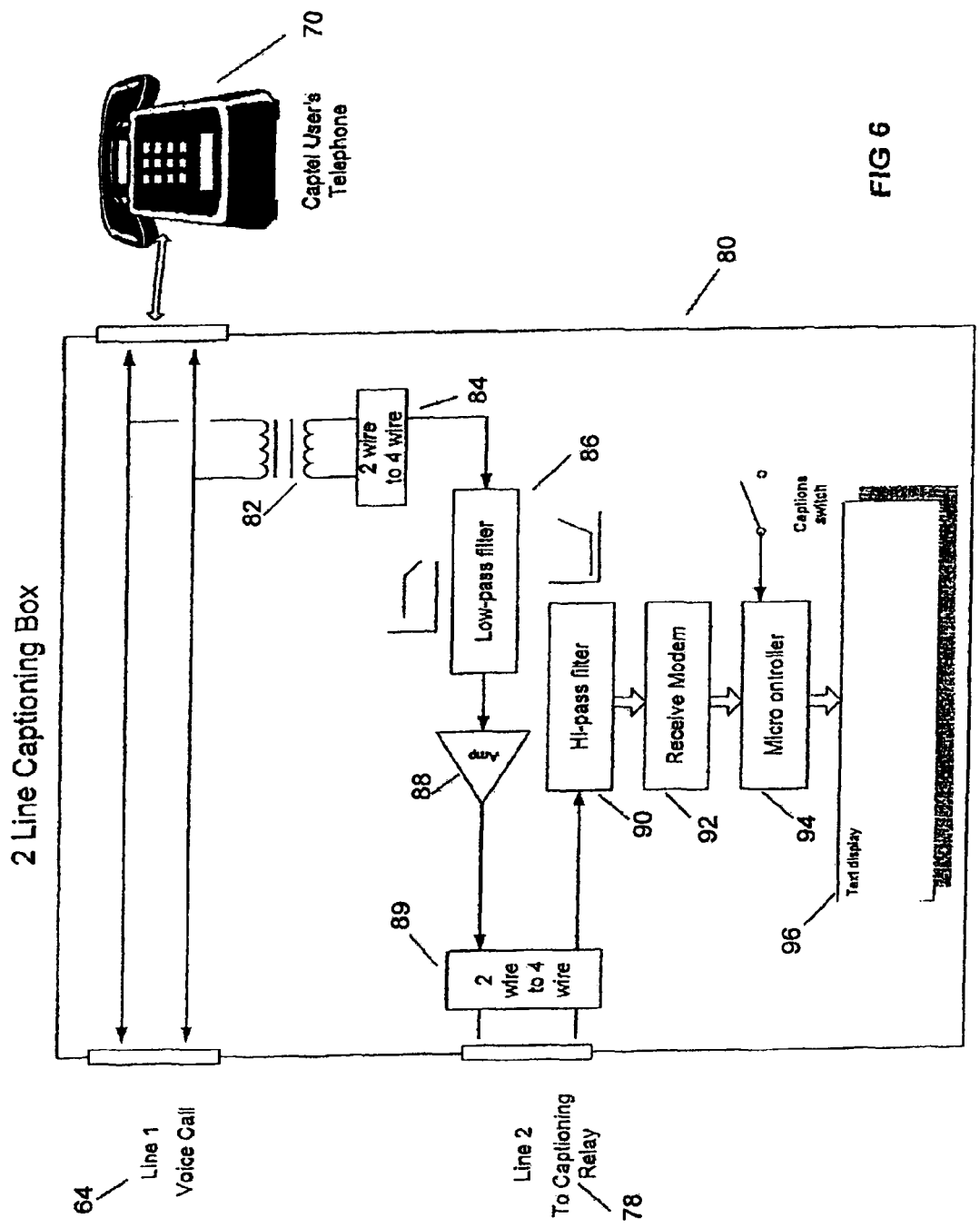
FIG. 6 is a schematic illustration of the connection of a personal interpreter/captioned telephone device connected to two telephone lines.

One device intended to implement the two-line captioned telephone approach is illustrated in FIG. 6. The PICT device 80 of FIG. 6 is an analog device connected in series between the telephone line 64 to the hearing user and the telephone 70 of the assisted user. As seen in FIG. 6, the telephone line 64 is connected directly through the PICT device 80 to the telephone 70. However, that telephone connection is also connected through a transformer 82 to a 2-wire to 4-wire converter 84. Connected to the output of the converter 84 is a low pass filter 86, the output of which is the input to an amplifier 88. The output of the amplifier 88 is connected to a 2-wire to 4-wire converter 89 which connects, in turn, to the telephone line 78 which connects to the relay (not shown here). The input signals from the telephone line 78 are connected to a hi-pass filter 90, the output of which passes through a receive modem 92 to a microcontroller 94. The microcontroller operates the display 96. The microcontroller also includes the capability to generate DTMF dialing tones and impress those tones on the telephone line 78 when it is time to dial the relay. Thus here the single PICT device 80 connects to two telephone lines. A call can be initiated or received by the assisted user in the same manner as with a conventional telephone, using only the first telephone line 64. When the user wishes to invoke the captioning service, the assisted user presses a button, 97, on the PICT device 80 that causes the device to automatically dial the relay on the second telephone line 78. The PICT device automatically transmits the voice signals on the first telephone line to the second telephone line (through the low-pass filter 86) for transmission to the relay. At the relay, the voice is converted into text and a text stream is sent back down the telephone connection 78 to the PICT device. The PICT device filters the text data, at the hi-pass filter 90, and transmits it to the microcontroller 94 for display to the user. None of the text data, and no digital carrier signals, are heard by either the hearing user or the assisted user. Normally the hearing user does not even need to be aware that captioning is being used on the call.

This example assumes that the digital carrier signals for the text message are carried on high frequencies, and the low pass and high pass filters are used to separate voice from text. While this filtering can be implemented as an analog filter, in many telephonic systems today, digital forms of communication are used. Using a digital communication protocol between the relay and the PICT device, communication is in the form of digital data packets of either text or digitized voice. In that event, the logical filtering simply consists of not creating any acoustic noise from the packets designated as carrying text.

Several physical versions of the PICT device are contemplated. In the version illustrated in FIG. 5, the PICT device is a stand-alone appliance inserted in series between the telephone of the assisted user and the telephone jack on the wall of the user's home. It may also be convenient for the user to package the PICT device as a single two-line unit intended to provide both conventional telephone service, as well as captioned telephone services. The device could look like a normal telephone, but have a display. The captioned telephone feature would be activated by a button or key, which would cause the unit to dial a pre-selected relay and set up a captioning session, whether or not a call on the other line is yet in progress. The voice signals incoming on the first telephone line from the hearing user would be transferred electronically to the telephone line to the relay. Text signals would be transmitted on that same telephone line back from the relay to the PICT device, which would display that text for the assisted user. Since the re-voicing relay operates with only a very slight time delay, the text display for the assisted user would trail the hearing person's voice slightly, but the text would still assist the user in comprehending the conversation.

It is a desirable feature of the two-line captioned telephone arrangement that the use of the captioning service is transparent to the hearing user. The hearing user would dial to connect to the assisted user as with any other telephone user. The assisted user invokes the captioned telephone service without the need to involve the hearing user at all. The service can be used equally well and transparently for both incoming and outgoing calls.

It is also envisioned that the captioned telephone service can be implemented in a way that uses three telephone lines. One line is for voice communications with the hearing user. The second line is directly connected to the first line so that the voice of the hearing user is transmitted to the relay. The third line is a connection to transmit the text stream from the relay to the station of the assisted user.

In the implementation of a relay providing captioned telephone service, the relay receives the voice of the hearing user and transmits both a digital text message stream and the voice of the hearing user over a telephone connection to the station of the assisted user. It is to be understood, however, that a conventional telephone single line connection is only one example of a telephonic connection that can be used in this arrangement. Digital wireless connection, or PCS connection, or even internet protocol (IP), wired or wireless connection can be used to connect the relay to the assisted user, so long as the connection in capable of transmitting voice to that user.

Thus the term telephone line as used in this specification is intended not only to apply to a traditional land-line two-wire telephone line, but also to all equivalents that offer similar functionality. Each of the telephone lines could be, for example, a portion of the bandwidth of an ISDN or DSL service. The telephone line could be an analog or digital cellular telephone link or a PCS connection. The PICT device could also be connected to the internet communication in IP, and in that event the two telephone lines would simply be simultaneous digital data exchange with two remote locations.

It is to be understood that the present invention is not limited to the particular illustrations and embodiments disclosed above, but embraces all such modified forms thereof as come within the scope of the following claims.

We claim:

1. A communication system comprising:
a hard of hearing user's captioned device, the captioned device including a display screen and a processor, the processor in the captioned device configured to:
establish communication with a hard of hearing user's phone device that is independent of the hard of hearing user's captioned device;
receive a text communication originating at a relay, the text communication corresponding to a transcription of a hearing user's voice signal; and
display a text caption corresponding to the text communication on the display of the hard of hearing user's captioned device;
wherein at least one of the captioned device and the hard of hearing user's phone device is configured to establish a first communication link directly with the relay for routing the hearing user's voice signal to the relay; and
wherein the captioned device includes an activation button which, when selected, initiates a communication link with the relay and transmission of the hearing user's voice signal to the relay for transcription into text.

2. The communication system of claim 1 wherein the captioned device establishes communication with the hard of hearing user's phone device via an acoustic coupling to the hard of hearing user's phone device.

3. The communication system of claim 1 wherein the captioned device is configured to establish communication with the hard of hearing user's phone device in response to a user input.

4. The communication system of claim 1 wherein the captioned device further comprises a button and wherein the captioned device is further configured to receive the hearing user's voice signal responsive to a detection of a user selecting the button.

5. The communication system of claim 1 wherein the captioned device comprises a communication connection configured to establish the communication with the hard of hearing user's phone device.

6. The communication system of claim 5 wherein the communication connection includes at least one of an acoustic coupling to the phone device and an electrical connection to the phone device.

7. The communication system of claim 5 wherein the communication connection includes an electrical connection between the phone device and the captioned device.

8. The communication system of claim 1 wherein the processor is configured to establish the communication link to the relay responsive to selection of the activation button and to transmit the hearing user's voice signal to the relay after the communication link is established.

9. The communication system of claim 1 wherein the captioned device establishes communication with the hard of hearing user's phone device such that the hearing user's voice signal is received at the captioned device.

10. The communication system of claim 1 wherein an action from the hard of hearing user establishes communication between the hard of hearing user's phone device and the captioned device.

11. The communication system of claim 1 wherein the hard of hearing user's phone device can be used independently of the captioned device to facilitate a voice conversation with a hearing user using the hearing user's device.

12. The communication system of claim 1 wherein the captioned device receives the text communication from the relay on the first communication link.

13. The communication system of claim 1 wherein the hard of hearing user's phone device is a hard of hearing user's cellular phone device.

14. The communication system of claim 13 wherein the hard of hearing user's cellular phone device can be used independent of the captioned device to facilitate a voice conversation with a hearing user using the hearing user's device.

15. The communication system of claim 13 wherein the step of establishing communication includes coupling the hard of hearing user's cellular phone device to the captioned device.

16. The communication system of claim 15 wherein the step of coupling the hard of hearing user's cellular device to the captioned device includes physically coupling the hard of hearing user's cellular device to the captioned device.

17. The communication system of claim 16 wherein the step of coupling the hard of hearing user's cellular phone device to the captioned device includes forming an electrical connection between the hard of hearing user's phone device and the captioned device.

18. The communication system of claim 16 wherein the step of coupling the hard of hearing user's cellular phone device to the captioned device includes establishing an acoustic coupling between the hard of hearing user's phone device and the captioned device.

19. A communication system comprising:
a hard of hearing user's captioned device, the captioned device including a display screen and a processor, the processor in the captioned device configured to:
establish communication with a hard of hearing user's phone device that is independent of the hard of hearing user's captioned device;
receive a text communication originating at a relay, the text communication corresponding to a transcription of a hearing user's voice signal; and display a text caption corresponding to the text communication on the display of the hard of hearing user's captioned device;

wherein at least one of the captioned device and the hard of hearing user's phone device is configured to establish a first communication link directly with the relay for routing the hearing user's voice signal to the relay; and wherein the captioned device routes the hearing user's voice signal from the hard of hearing user's phone device to the relay.

20. A communication system comprising:

a hard of hearing user's captioned device, the captioned device including a display screen and a processor, the processor in the captioned device configured to:

establish communication with a hard of hearing user's phone device that is independent of the hard of hearing user's captioned device;

receive a text communication originating at a relay, the text communication corresponding to a transcription of a hearing user's voice signal; and display a text caption corresponding to the text communication on the display of the hard of hearing user's captioned device;

wherein at least one of the captioned device and the hard of hearing user's phone device is configured to establish a first communication link directly with the relay for routing the hearing user's voice signal to the relay; and wherein the captioned device is configured to receive the text communication directly from the relay without passing through the hard of hearing user's phone device.

21. A communication system comprising:

a hard of hearing user's captioned device, the captioned device including a display screen and a processor, the processor in the captioned device configured to:

establish communication with a hard of hearing user's phone device that is independent of the hard of hearing user's captioned device;

receive a text communication originating at a relay, the text communication corresponding to a transcription of a hearing user's voice signal; and display a text caption corresponding to the text communication on the display of the hard of hearing user's captioned device;

wherein at least one of the captioned device and the hard of hearing user's phone device is configured to establish a first communication link directly with the relay for routing the hearing user's voice signal to the relay; and wherein the captioned device establishes the first communication link with the relay.

22. A communication system comprising:

a hard of hearing user's captioned device, the captioned device including a display screen and a processor, the processor in the captioned device configured to:

establish communication with a hard of hearing user's phone device that is independent of the hard of hearing user's captioned device;

receive a text communication originating at a relay, the text communication corresponding to a transcription of a hearing user's voice signal; and display a text caption corresponding to the text communication on the display of the hard of hearing user's captioned device;

wherein at least one of the captioned device and the hard of hearing user's phone device is configured to establish a first communication link directly with the relay for routing the hearing user's voice signal to the relay; and wherein the captioned device receives the text communication from the relay on a second communication link that is independent of the first communication link.

23. The communication system of claim 22 wherein the second communication link is a wireless communication link.

24. The communication system of claim 22 wherein the captioned device receives the text communication directly via the second communication link without passing through the hard of hearing user's phone device.

25. The communication system of claim 22 wherein the second communication link is a cellular communication link.

26. A communication system comprising:

a hard of hearing user's captioned device, the captioned device including a display screen and a processor, the processor of the captioned device configured to:

establish communication with a hard of hearing user's phone device that is independent of the hard of hearing user's captioned device;

receive a text communication originating at a relay, the text communication corresponding to a transcription of a hearing user's voice signal; and display a text caption corresponding to the text communication on the display of the hard of hearing user's captioned device;

wherein the captioned device further comprises an input device configured to detect a selection of a caption button, wherein the processor is configured to establish a communication link to the relay responsive to selection of the caption button and to transmit the hearing user's voice signal to the relay after the communication link is established.

27. The communication system of claim 26 wherein the captioned device establishes communication with the hard of hearing user's phone device via an acoustic coupling to the hard of hearing user's phone device.

28. The communication system of claim 26 wherein the captioned device is configured to establish communication with the hard of hearing user's phone device in response to a user input.

29. The communication system of claim 28 wherein the captioned device further comprises a button and wherein the captioned device is further configured to receive the hearing user's voice signal responsive to a detection of a user selecting the button.

30. The communication system of claim 26 wherein the captioned device comprises a communication connection configured to establish the communication with the hard of hearing user's phone device.

31. The communication system of claim 26 wherein the captioned device establishes communication with the hard of hearing user's phone device such that the hearing user's voice signal is received at the captioned device.

32. The communication system of claim 31 wherein an action from the hard of hearing user establishes communication between the hard of hearing user's phone device and the captioned device.

33. The communication system of claim 32 wherein the hard of hearing user's phone device can be used independently of the captioned device to facilitate a voice conversation with a hearing user using the hearing user's device.

34. The communication system of claim 33 wherein the captioned device receives the text communication from the relay on the first communication link.

35. The communication system of claim 33 wherein the captioned device receives the text communication from the relay on a second communication link that is independent of the first communication link.

36. The communication system of claim 35 wherein the second communication link is a wireless communication link.

37. The communication system of claim 35 wherein the captioned device receives the text communication directly via the second communication link without passing through the hard of hearing user's phone device.

38. The communication system of claim 35 wherein the second communication link is a cellular communication link.

39. The communication system of claim 35 wherein the hard of hearing user's phone device is a hard of hearing user's cellular phone device.

40. The communication system of claim 39 wherein the hard of hearing user's cellular phone device can be used independent of the captioned device to facilitate a voice conversation with a hearing user using the hearing user's device.

41. The communication system of claim 35 wherein the hard of hearing user's phone device is a hard of hearing user's cellular phone device.

42. A communication system comprising:
a hard of hearing user's captioned device, the captioned device including a display screen and a processor, the captioned device configured to:
establish communication with a hard of hearing user's wireless phone device that is independent of the hard of hearing user's captioned device;
receive a hearing user's voice signal originating at a hearing user's phone device from the hard of hearing user's phone device;
establish a first communication link with a relay;
route the hearing user's voice signal via the first communication link to the relay for transcription;
receive a text communication originating at the relay on a second communication link that is separate from the first communication link, the text communication corresponding to a transcription of the hearing user's voice signal; and
display a text caption corresponding to the text communication on the display.

43. The communication system of claim 42 wherein the captioned device routes the hearing user's voice signal through the hard of hearing user's phone device to the relay.

44. The communication system of claim 42 wherein the captioned device is configured to receive the text communication directly from the relay without passing through the hard of hearing user's phone device.

45. The communication system of claim 42 wherein the captioned device is configured to establish communication with the hard of hearing user's phone device in response to a user input.

46. The communication system of claim 45 wherein the captioned device further comprises a button and wherein the captioned device is further configured to receive the hearing user's voice signal responsive to a detection of a user selecting the button.

47. The communication system of claim 42 wherein the captioned device comprises a communication connection configured to establish the communication with the hard of hearing user's phone device.

48. The communication system of claim 42 wherein the captioned device establishes communication with the hard of hearing user's phone device such that the hearing user's voice signal is received at the captioned device.

49. The communication system of claim 42 wherein an action from the hard of hearing user establishes communication between the hard of hearing user's phone device and the captioned device.

50. The communication system of claim 42 wherein the hard of hearing user's phone device can be used independently of the captioned device to facilitate a voice conversation with a hearing user using the hearing user's device.

51. The communication system of claim 50 wherein the captioned device receives the text communication from the relay on the first communication link.

52. The communication system of claim 50 wherein the captioned device receives the text communication from the relay on a second communication link that is independent of the first communication link.

53. The communication system of claim 52 wherein the second communication link is a wireless communication link.

54. The communication system of claim 42 wherein the captioned device receives the text communication directly via the second communication link without passing through the hard of hearing user's phone device.

55. The communication system of claim 54 wherein the second communication link is a cellular communication link.

56. A communication system, comprising:
a hard of hearing user's captioned device, the captioned device including a display screen and a processor, the processor of the captioned device configured to:
establish communication with a hard of hearing user's phone device that is independent of the hard of hearing user's captioned device;
receive a text communication originating at a relay, a text communication corresponding to a transcription of a hearing user's voice signal; and
display a text caption corresponding to the text communication on the display of the hard of hearing user's captioned device;
wherein the captioned device establishes communication with the hard of hearing user's phone device such that the hearing user's voice signal is received at the captioned device.

57. The communication system of claim 56 wherein the captioned device is configured to establish communication with the hard of hearing user's phone device in response to a user input.

58. The communication system of claim 56 wherein the captioned device further comprises a button and wherein the captioned device is further configured to receive the hearing user's voice signal responsive to a detection of a user selecting the button.

59. The communication system of claim 56 wherein the captioned device comprises a communication connection configured to establish the communication with the hard of hearing user's phone device.

60. The communication system of claim 56 wherein an action from the hard of hearing user establishes communication between the hard of hearing user's phone device and the captioned device.

61. The communication system of claim 60 wherein the hard of hearing user's phone device can be used independently of the captioned device to facilitate a voice conversation with a hearing user using the hearing user's device.

62. The communication system of claim 61 wherein the hard of hearing user's phone device is a hard of hearing user's cellular phone device.

63. The communication system of claim 62 wherein the hard of hearing user's cellular phone device can be used independent of the captioned device to facilitate a voice conversation with a hearing user using the hearing user's device.

* * * * *